US012661855B2

(12) United States Patent
Serencsits et al.

(10) Patent No.: US 12,661,855 B2
(45) **Date of Patent: *Jun. 23, 2026**

(54) BLADE STRINGER FORMING METHODS AND TOOLING

(71) Applicant: The Boeing Company, Arlington, VA (US)

(72) Inventors: William L. Serencsits, Hollywood, SC (US); Jessica Offutt Fry, Charleston, SC (US); Justin Albright, La Mirada, CA (US)

(73) Assignee: The Boeing Company, Arlington, VA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/415,410

(22) Filed: Jan. 17, 2024

(65) Prior Publication Data

US 2024/0269944 A1     Aug. 15, 2024

Related U.S. Application Data

(60) Provisional application No. 63/484,134, filed on Feb. 9, 2023.

(51) Int. Cl.
　　*B29C 70/44* 　　　(2006.01)
　　*B29C 70/46* 　　　(2006.01)
　　*B29L 31/30* 　　　(2006.01)

(52) U.S. Cl.
　　CPC .......... *B29C 70/446* (2013.01); *B29C 70/462* (2013.01); *B29L 2031/3082* (2013.01)

(58) Field of Classification Search
None
See application file for complete search history.

(56) References Cited

U.S. PATENT DOCUMENTS

| | | | |
|---|---|---|---|
| 7,588,655 | B2 | 9/2009 | Pham et al. |
| 7,588,711 | B2 | 9/2009 | Depase et al. |
| 8,043,554 | B2 | 10/2011 | Yip et al. |

(Continued)

FOREIGN PATENT DOCUMENTS

| | | |
|---|---|---|
| CN | 115008787 A | 9/2022 |
| DE | 102007015519 A1 | 10/2008 |
| EP | 3398759 B1 | 12/2022 |

OTHER PUBLICATIONS

Extended European Search Report, dated Oct. 1, 2024, regarding EP Application No. 24151905.7, 16 pages.

(Continued)

*Primary Examiner* — Abbas Rashid
*Assistant Examiner* — Adrianna N Konves
(74) *Attorney, Agent, or Firm* — Yee & Associates, P.C.

(57) ABSTRACT

Forming and curing tools and method of forming a blade stringer. A first cut and kitted material and a second cut and kitted material are clamped between a first die and a second die. The first cut and kitted material and the second cut and kitted material are formed against the first die and the second die while the first cut and kitted material and the second cut and kitted material are clamped. A noodle and base material are applied over the first cut and kitted material and second cut and kitted material. A composite stringer preform comprising the first cut and kitted material, the second cut and kitted material, the noodle, and the base material is cured while the composite stringer preform is against the first die and the second die.

25 Claims, 24 Drawing Sheets

(56)  References Cited

U.S. PATENT DOCUMENTS

| | | |
|---|---|---|
| 8,555,945 B2 | 10/2013 | Torres Martinez |
| 9,149,990 B2 | 10/2015 | Lengsfeld et al. |
| 9,676,147 B2 | 6/2017 | Charines et al. |
| 10,864,688 B2 | 12/2020 | Shinozaki |
| 10,921,210 B2 | 2/2021 | Dull |
| 11,135,789 B2 | 10/2021 | Coxon et al. |
| 11,794,376 B2 | 10/2023 | Kendall |
| 2009/0320995 A1 | 12/2009 | Menendez Martin et al. |
| 2012/0258276 A1 | 10/2012 | Modin et al. |
| 2013/0240150 A1 | 9/2013 | Suzuki et al. |
| 2017/0120541 A1 | 5/2017 | Chapman et al. |
| 2019/0030842 A1 | 1/2019 | Miranda et al. |
| 2019/0329509 A1 | 10/2019 | Coxon et al. |
| 2022/0080649 A1 | 3/2022 | Plummer et al. |
| 2024/0269945 A1 | 8/2024 | Serencsits et al. |

OTHER PUBLICATIONS

Partial European Search Report, dated Jul. 8, 2024, regarding EP Application No. 24151905.7, 16 pages.
European Patent Office Action, dated Apr. 30, 2025, regarding EP Application No. 24151929.7, 5 pages.
Notice of Allowance, dated Dec. 9, 2025, regarding U.S. Appl. No. 18/500,440, 20 pages.

FROM FIG. 16A

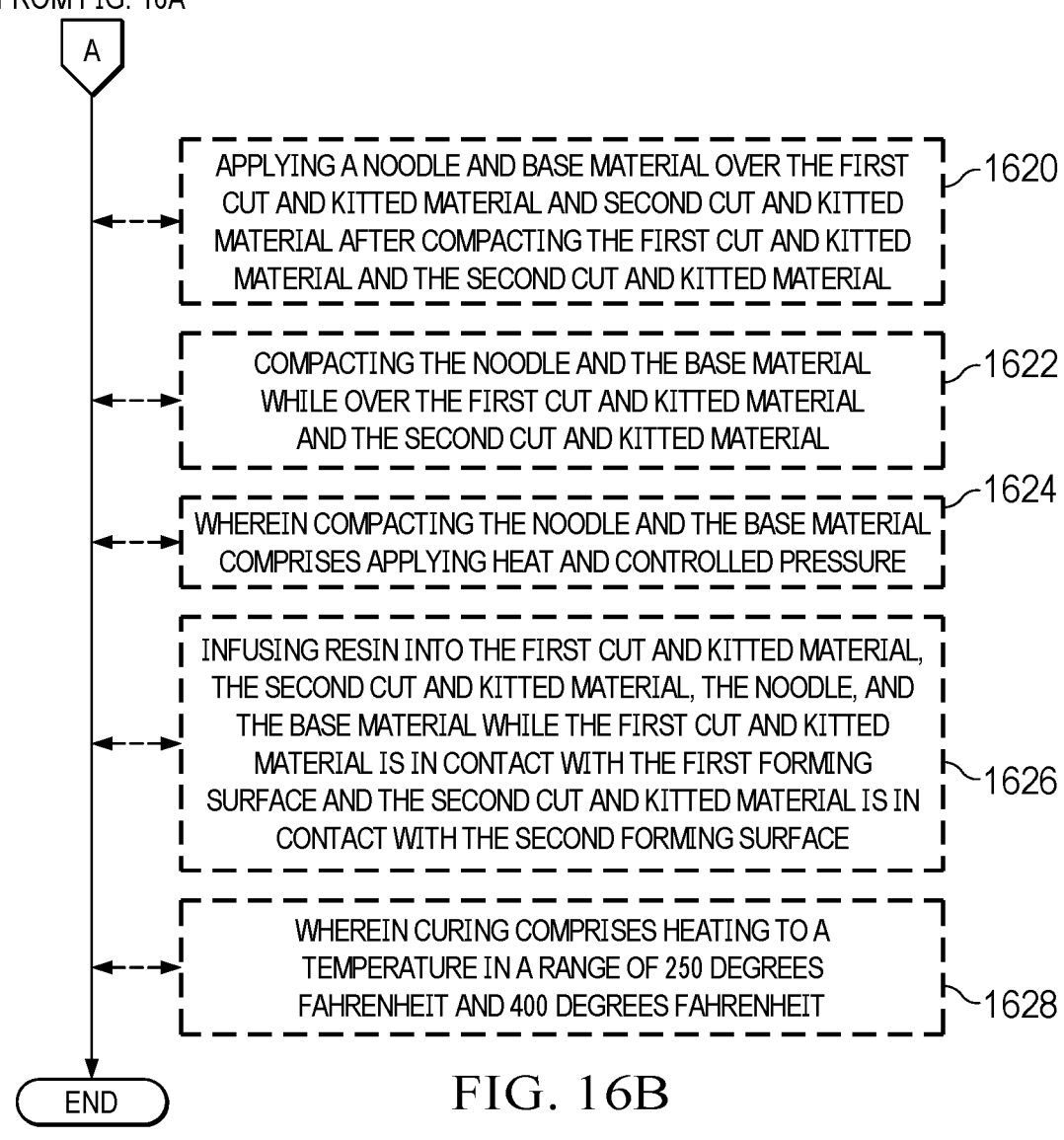

A

APPLYING A NOODLE AND BASE MATERIAL OVER THE FIRST CUT AND KITTED MATERIAL AND SECOND CUT AND KITTED MATERIAL AFTER COMPACTING THE FIRST CUT AND KITTED MATERIAL AND THE SECOND CUT AND KITTED MATERIAL ⟋1620

COMPACTING THE NOODLE AND THE BASE MATERIAL WHILE OVER THE FIRST CUT AND KITTED MATERIAL AND THE SECOND CUT AND KITTED MATERIAL ⟋1622

WHEREIN COMPACTING THE NOODLE AND THE BASE MATERIAL COMPRISES APPLYING HEAT AND CONTROLLED PRESSURE ⟋1624

INFUSING RESIN INTO THE FIRST CUT AND KITTED MATERIAL, THE SECOND CUT AND KITTED MATERIAL, THE NOODLE, AND THE BASE MATERIAL WHILE THE FIRST CUT AND KITTED MATERIAL IS IN CONTACT WITH THE FIRST FORMING SURFACE AND THE SECOND CUT AND KITTED MATERIAL IS IN CONTACT WITH THE SECOND FORMING SURFACE ⟍1626

WHEREIN CURING COMPRISES HEATING TO A TEMPERATURE IN A RANGE OF 250 DEGREES FAHRENHEIT AND 400 DEGREES FAHRENHEIT ⟍1628

END

Figure 17A:
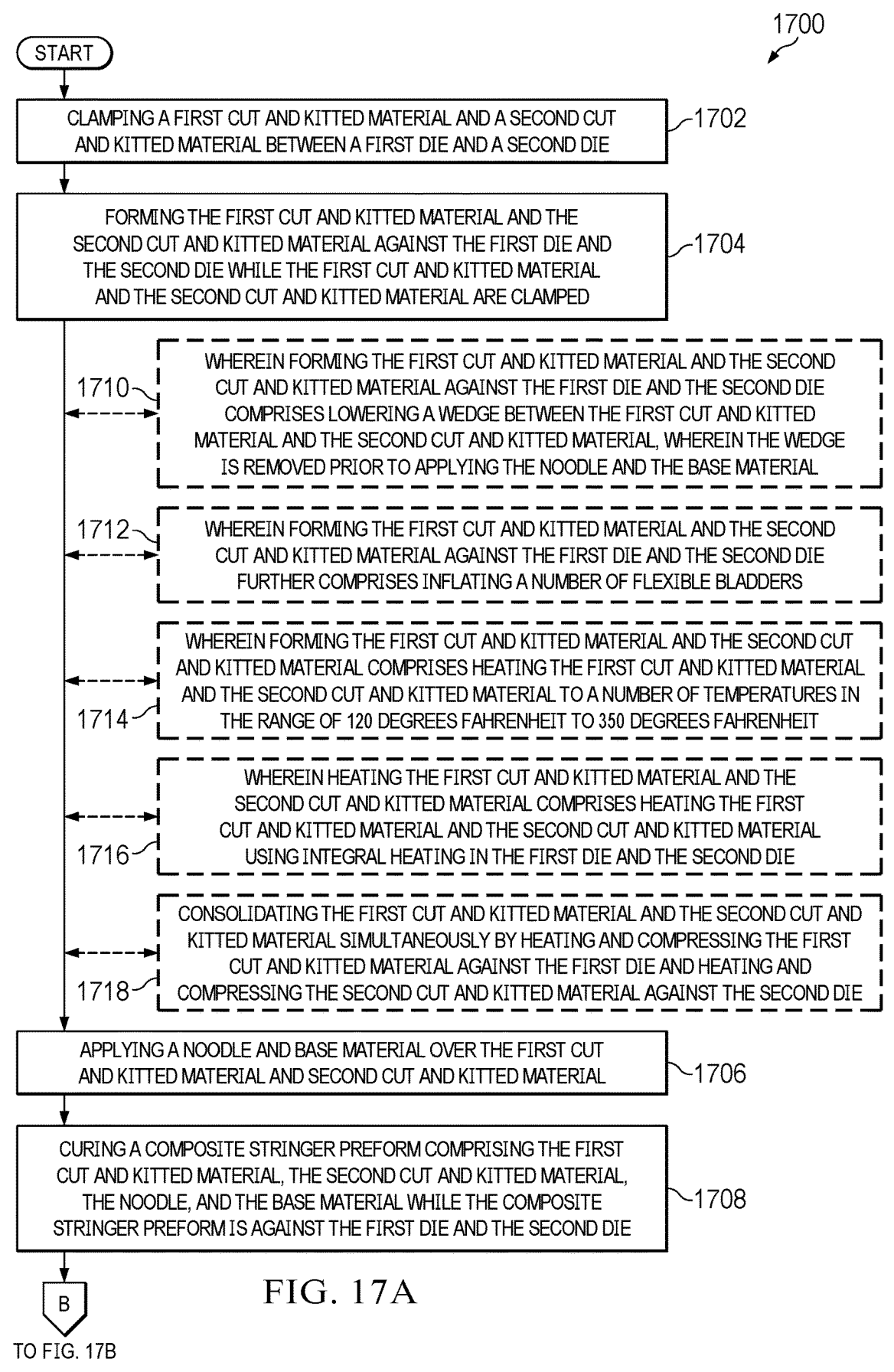

START

CLAMPING A FIRST CUT AND KITTED MATERIAL AND A SECOND CUT AND KITTED MATERIAL BETWEEN A FIRST DIE AND A SECOND DIE ⎯1702

FORMING THE FIRST CUT AND KITTED MATERIAL AND THE SECOND CUT AND KITTED MATERIAL AGAINST THE FIRST DIE AND THE SECOND DIE WHILE THE FIRST CUT AND KITTED MATERIAL AND THE SECOND CUT AND KITTED MATERIAL ARE CLAMPED ⎯1704

1710⎯ WHEREIN FORMING THE FIRST CUT AND KITTED MATERIAL AND THE SECOND CUT AND KITTED MATERIAL AGAINST THE FIRST DIE AND THE SECOND DIE COMPRISES LOWERING A WEDGE BETWEEN THE FIRST CUT AND KITTED MATERIAL AND THE SECOND CUT AND KITTED MATERIAL, WHEREIN THE WEDGE IS REMOVED PRIOR TO APPLYING THE NOODLE AND THE BASE MATERIAL

1712⎯ WHEREIN FORMING THE FIRST CUT AND KITTED MATERIAL AND THE SECOND CUT AND KITTED MATERIAL AGAINST THE FIRST DIE AND THE SECOND DIE FURTHER COMPRISES INFLATING A NUMBER OF FLEXIBLE BLADDERS

WHEREIN FORMING THE FIRST CUT AND KITTED MATERIAL AND THE SECOND CUT AND KITTED MATERIAL COMPRISES HEATING THE FIRST CUT AND KITTED MATERIAL AND THE SECOND CUT AND KITTED MATERIAL TO A NUMBER OF TEMPERATURES IN THE RANGE OF 120 DEGREES FAHRENHEIT TO 350 DEGREES FAHRENHEIT 1714⎯

WHEREIN HEATING THE FIRST CUT AND KITTED MATERIAL AND THE SECOND CUT AND KITTED MATERIAL COMPRISES HEATING THE FIRST CUT AND KITTED MATERIAL AND THE SECOND CUT AND KITTED MATERIAL USING INTEGRAL HEATING IN THE FIRST DIE AND THE SECOND DIE 1716⎯

CONSOLIDATING THE FIRST CUT AND KITTED MATERIAL AND THE SECOND CUT AND KITTED MATERIAL SIMULTANEOUSLY BY HEATING AND COMPRESSING THE FIRST CUT AND KITTED MATERIAL AGAINST THE FIRST DIE AND HEATING AND 1718⎯ COMPRESSING THE SECOND CUT AND KITTED MATERIAL AGAINST THE SECOND DIE

APPLYING A NOODLE AND BASE MATERIAL OVER THE FIRST CUT AND KITTED MATERIAL AND SECOND CUT AND KITTED MATERIAL ⎯1706

CURING A COMPOSITE STRINGER PREFORM COMPRISING THE FIRST CUT AND KITTED MATERIAL, THE SECOND CUT AND KITTED MATERIAL, THE NOODLE, AND THE BASE MATERIAL WHILE THE COMPOSITE STRINGER PREFORM IS AGAINST THE FIRST DIE AND THE SECOND DIE ⎯1708

FROM FIG. 17A

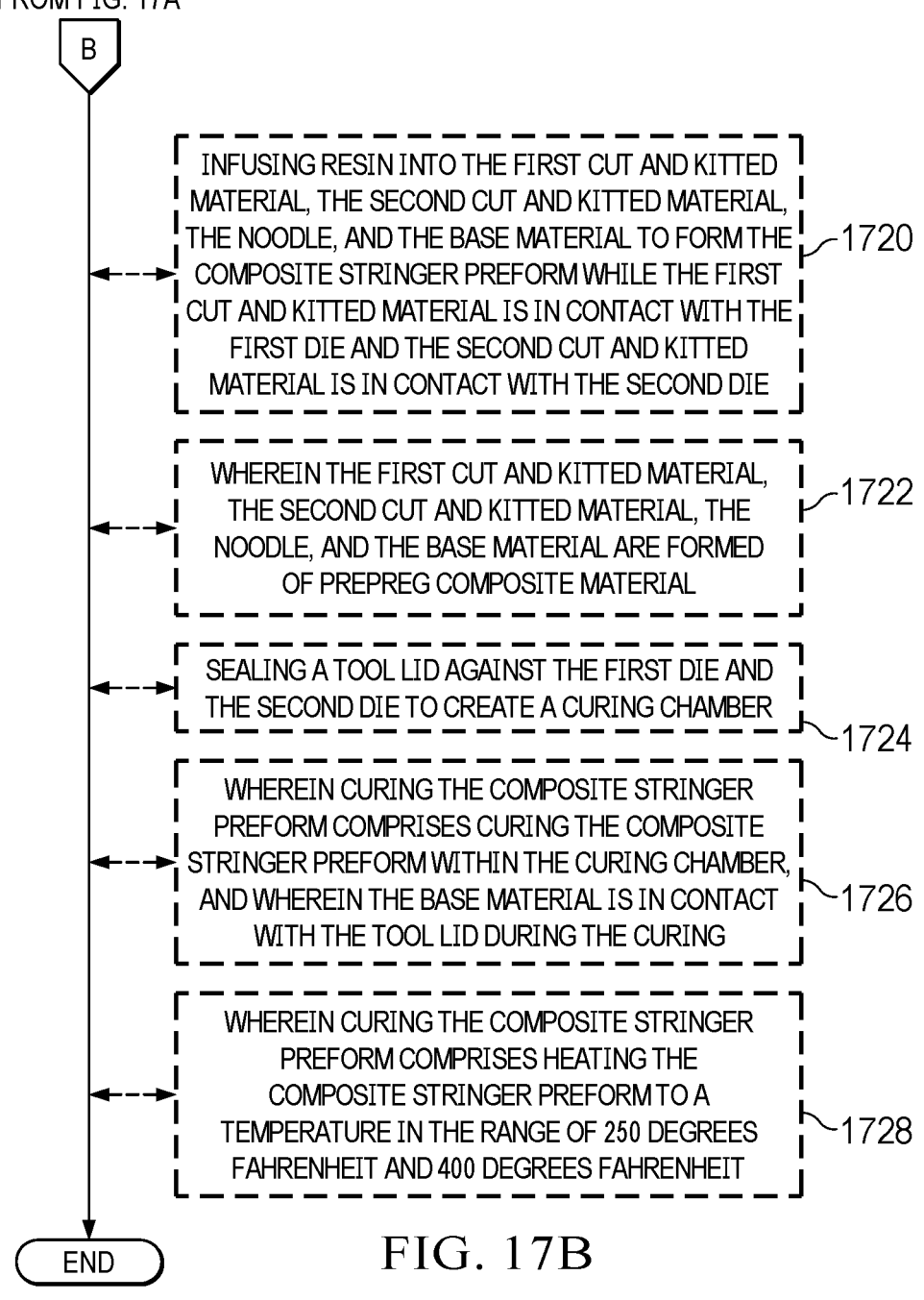

B

INFUSING RESIN INTO THE FIRST CUT AND KITTED
MATERIAL, THE SECOND CUT AND KITTED MATERIAL,
THE NOODLE, AND THE BASE MATERIAL TO FORM THE
COMPOSITE STRINGER PREFORM WHILE THE FIRST
CUT AND KITTED MATERIAL IS IN CONTACT WITH THE
FIRST DIE AND THE SECOND CUT AND KITTED
MATERIAL IS IN CONTACT WITH THE SECOND DIE — 1720

WHEREIN THE FIRST CUT AND KITTED MATERIAL,
THE SECOND CUT AND KITTED MATERIAL, THE
NOODLE, AND THE BASE MATERIAL ARE FORMED
OF PREPREG COMPOSITE MATERIAL — 1722

SEALING A TOOL LID AGAINST THE FIRST DIE AND
THE SECOND DIE TO CREATE A CURING CHAMBER — 1724

WHEREIN CURING THE COMPOSITE STRINGER
PREFORM COMPRISES CURING THE COMPOSITE
STRINGER PREFORM WITHIN THE CURING CHAMBER,
AND WHEREIN THE BASE MATERIAL IS IN CONTACT
WITH THE TOOL LID DURING THE CURING — 1726

WHEREIN CURING THE COMPOSITE STRINGER
PREFORM COMPRISES HEATING THE
COMPOSITE STRINGER PREFORM TO A
TEMPERATURE IN THE RANGE OF 250 DEGREES
FAHRENHEIT AND 400 DEGREES FAHRENHEIT — 1728

END

FIG. 17B

FROM FIG. 18A

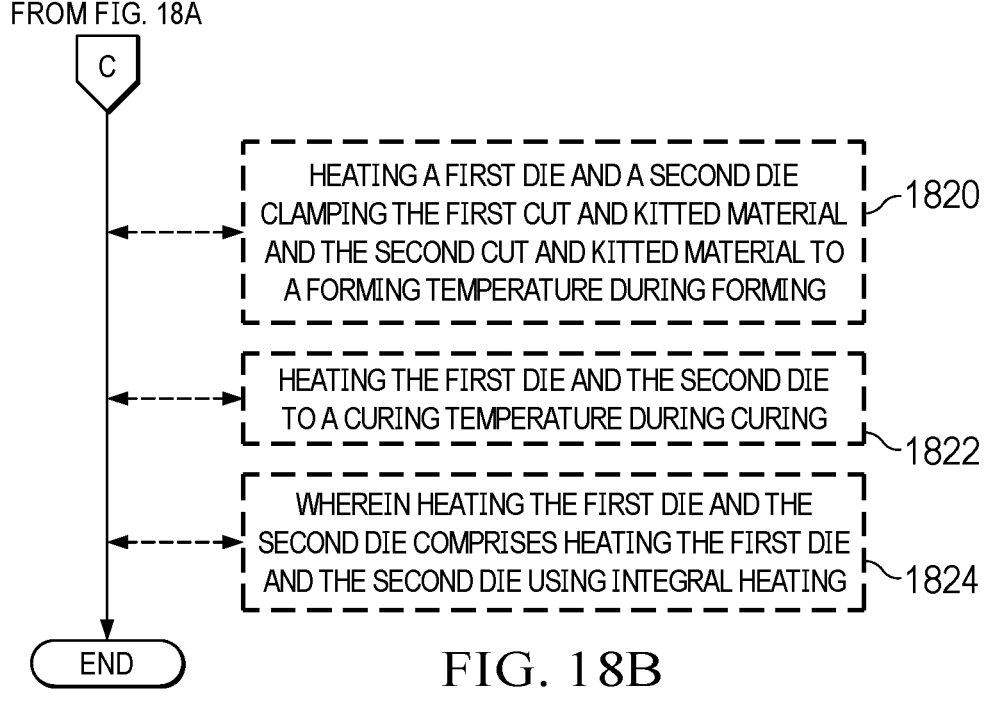

C

HEATING A FIRST DIE AND A SECOND DIE
CLAMPING THE FIRST CUT AND KITTED MATERIAL
AND THE SECOND CUT AND KITTED MATERIAL TO
A FORMING TEMPERATURE DURING FORMING          1820

HEATING THE FIRST DIE AND THE SECOND DIE
TO A CURING TEMPERATURE DURING CURING          1822

WHEREIN HEATING THE FIRST DIE AND THE
SECOND DIE COMPRISES HEATING THE FIRST DIE
AND THE SECOND DIE USING INTEGRAL HEATING          1824

END

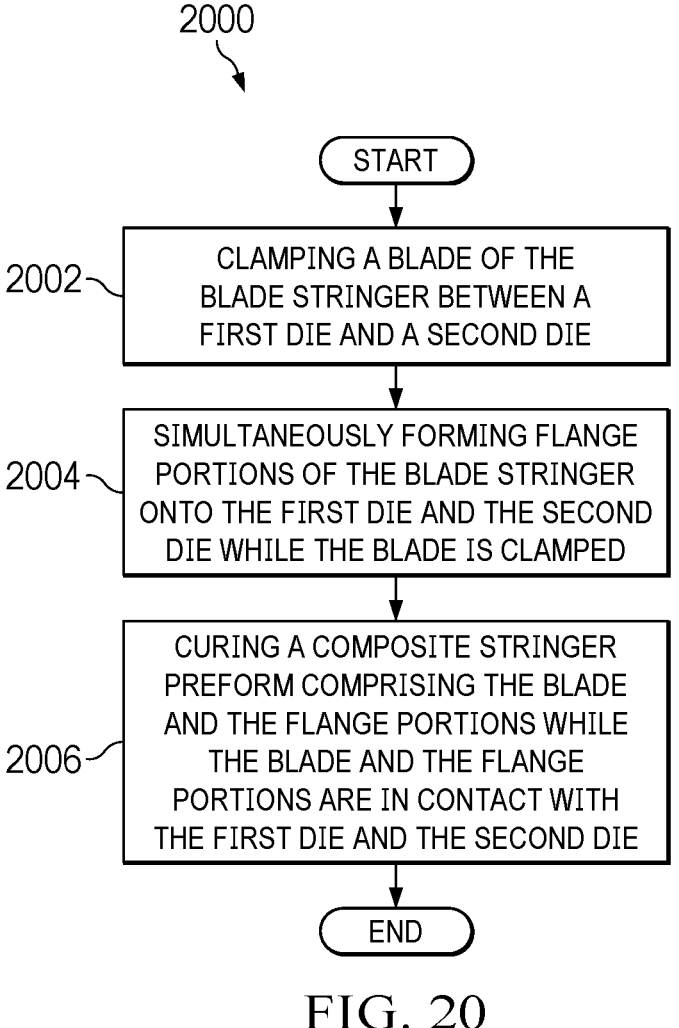

2000

START

2002 — CLAMPING A BLADE OF THE BLADE STRINGER BETWEEN A FIRST DIE AND A SECOND DIE

2004 — SIMULTANEOUSLY FORMING FLANGE PORTIONS OF THE BLADE STRINGER ONTO THE FIRST DIE AND THE SECOND DIE WHILE THE BLADE IS CLAMPED

2006 — CURING A COMPOSITE STRINGER PREFORM COMPRISING THE BLADE AND THE FLANGE PORTIONS WHILE THE BLADE AND THE FLANGE PORTIONS ARE IN CONTACT WITH THE FIRST DIE AND THE SECOND DIE

END

Figures 21, 22:
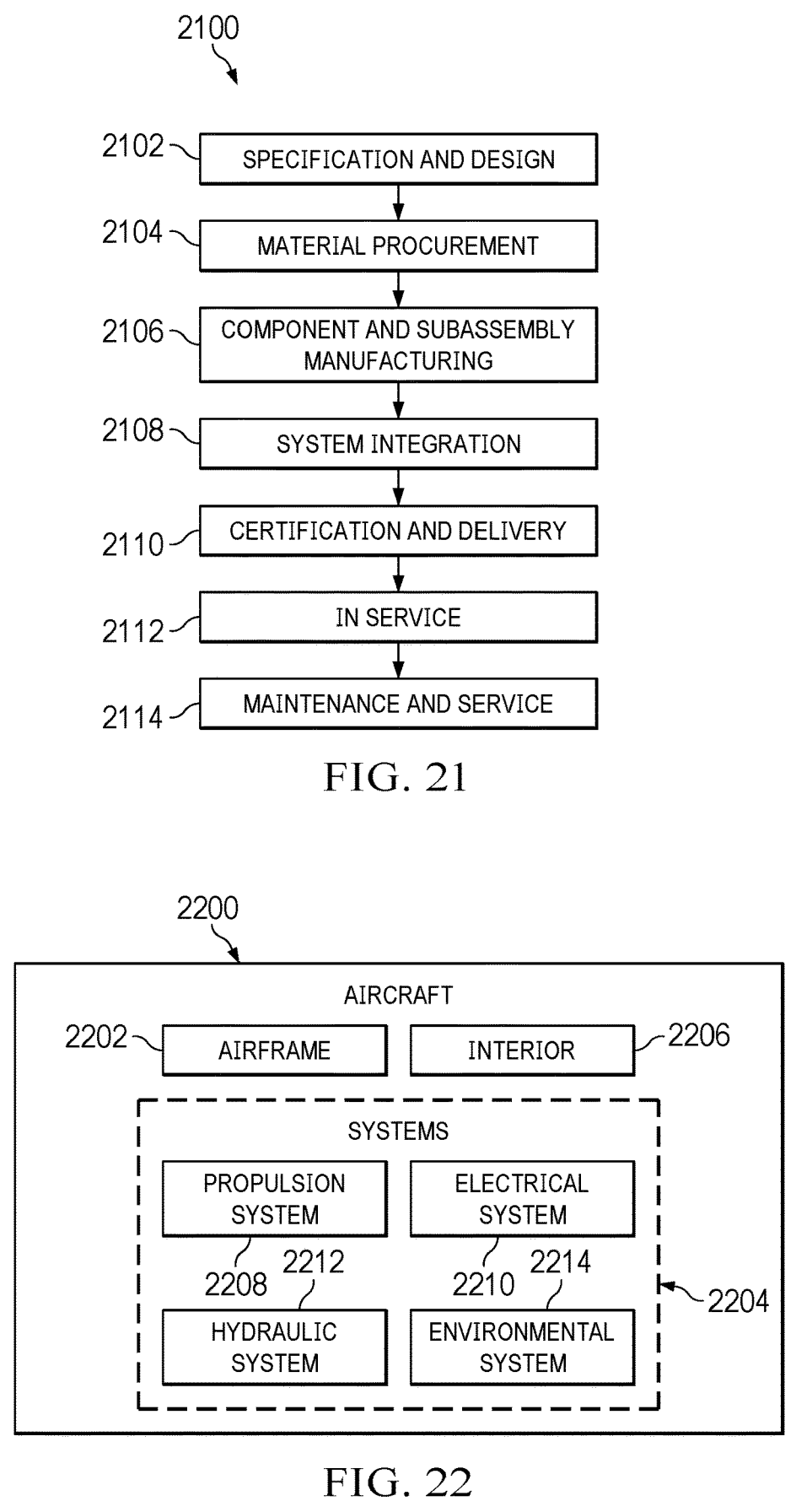

2102 — SPECIFICATION AND DESIGN

2104 — MATERIAL PROCUREMENT

2106 — COMPONENT AND SUBASSEMBLY MANUFACTURING

2108 — SYSTEM INTEGRATION

2110 — CERTIFICATION AND DELIVERY

2112 — IN SERVICE

2114 — MAINTENANCE AND SERVICE

AIRCRAFT

2202 — AIRFRAME          INTERIOR — 2206

SYSTEMS

PROPULSION SYSTEM          ELECTRICAL SYSTEM 2208   2212          2210   2214

HYDRAULIC SYSTEM          ENVIRONMENTAL SYSTEM

BLADE STRINGER FORMING METHODS AND TOOLING

CROSS-REFERENCE TO RELATED APPLICATION

This application claims priority to U.S. Provisional Patent Application Ser. No. 63/484,134, filed Feb. 9, 2023, and entitled "Blade Stringer Forming Methods and Tooling," which is incorporated herein by reference in its entirety.

BACKGROUND INFORMATION

1. Field

The present disclosure relates generally to forming composite structures and more specifically to forming and curing composite blade stringers.

2. Background

In manufacturing composite structures, the material stock is provided in flat sheets. The material stock is formed to bring the material into shape. After forming the material into a shape for a part, the part is exposed to elevated temperature and pressure for cure. In some examples, for dry materials resin is infused in the dry fiber prior to curing.

Current manufacturing processes utilize multiple tools. Some tools are used for forming, while other tools are used for curing. In some examples, additional tools are used for infusion of resin. Current manufacturing processes include transfer of formed parts from forming tools to separate cure or infusion tools. Transferring materials between multiple tools increases manufacturing time.

Therefore, it would be desirable to have a method and apparatus that takes into account at least some of the issues discussed above, as well as other possible issues.

SUMMARY

An embodiment of the present disclosure provides a forming and curing tool for a blade stringer comprising: a forming lid; a stiffener connected to and perpendicular to the forming lid; a number of flexible bladders surrounding the stiffener; and a wedge connected to the stiffener.

A forming and curing tool for a blade stringer comprising: a first die with a first forming surface comprising a first blade face and a first flange face and a number of vacuum paths through the first die; a second die with a number of vacuum paths and a second forming surface comprising a second blade face and a second flange face, the second die configured to clamp a number of cut and kitted materials between the first forming surface and the second forming surface; and a number of flexible bladders positioned above the first die and the second die and configured to simultaneously form the number of cut and kitted materials and then simultaneously compress a first cut and kitted material of the number of cut and kitted materials against the first flange face and a second cut and kitted material of the number of cut and kitted materials against the second flange face.

A forming and curing tool for a blade stringer comprising: a first die with a first forming surface comprising a first blade face and a first flange face and a number of vacuum paths through the first die; a second die with a number of vacuum paths and a second forming surface comprising a second blade face and a second flange face, the second die configured to clamp a number of cut and kitted materials between the first blade face and the second blade face for forming a number of cut and kitted materials against the first flange face and the second flange face; and a tool lid configured to seal against the first die and the second die to create a curing chamber.

A method of forming a blade stringer comprising: forming a first cut and kitted material onto a first flange face of a first forming surface and forming a second cut and kitted material onto a second flange face of a second forming surface while the first cut and kitted material and the second cut and kitted material are clamped between the first forming surface and the second forming surface; compacting the first cut and kitted material and the second cut and kitted material against the first forming surface and the second forming surface; and curing a composite stringer preform to form the blade stringer, the composite stringer preform comprising the first cut and kitted material, the second cut and kitted material, a noodle, and a base material while the composite stringer preform is against the first forming surface and the second forming surface.

A method of forming a blade stringer comprising: clamping a first cut and kitted material and a second cut and kitted material between a first die and a second die; forming the first cut and kitted material and the second cut and kitted material against the first die and the second die while the first cut and kitted material and the second cut and kitted material are clamped; applying a noodle and base material over the first cut and kitted material and second cut and kitted material; and curing a composite stringer preform comprising the first cut and kitted material, the second cut and kitted material, the noodle, and the base material while the composite stringer preform is against the first die and the second die.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 16A and 16B are a flowchart of a method of forming a blade stringer in accordance with an illustrative embodiment;

FIGS. 17A and 17B are a flowchart of a method of forming a blade stringer in accordance with an illustrative embodiment;

FIGS. 18A and 18B are a flowchart of a method of forming a blade stringer in accordance with an illustrative embodiment;

FIG. 20 are a flowchart of a method of forming a blade stringer in accordance with an illustrative embodiment;

FIG. 21 is an illustration of an aircraft manufacturing and service method in a form of a block diagram in accordance with an illustrative embodiment; and FIG. 22 is an illustration of an aircraft in a form of a block diagram in which an illustrative embodiment may be implemented.

DETAILED DESCRIPTION

The illustrative examples recognize and take into account one or more different considerations. For example, the illustrative examples recognize and take into account that composite materials are strong, light-weight materials created by combining two or more functional components. For example, a composite material may include reinforcing fibers bound in polymer resin matrix. The fibers can take the form of a unidirectional tape, woven cloth or fabric, or a braid.

In manufacturing composite structures, layers of composite material are typically laid up on a tool. The layers may be comprised of fibers in sheets. In some cases, resin may be infused or pre-impregnated into the sheets. These types of sheets are commonly referred to as prepreg.

The illustrative examples recognize and take into account that transferring formed material to curing tools can potentially induce wrinkles or other inconsistencies in the formed material. The illustrative examples recognize and take into account that an increased tool count can have a higher upfront investment cost. The illustrative examples recognize and take into account that an increased tool count uses a greater amount of storage space.

The illustrative examples recognize and take into account that separate forming tools and curing tools can increase risk of tolerance stack-up during transfer process. The illustrative examples recognize and take into account that transfer of components between tools increases WIP time. The illustrative examples recognize and take into account that both forming tools and curing tools utilize controlled application of heat and pressure.

The illustrative examples provide blade stringer forming methods and tooling. The illustrative examples form and then cure blade stringers utilizing a forming and curing tool. The forming and curing tool includes a number of dies used for both forming and curing.

Figure 1:
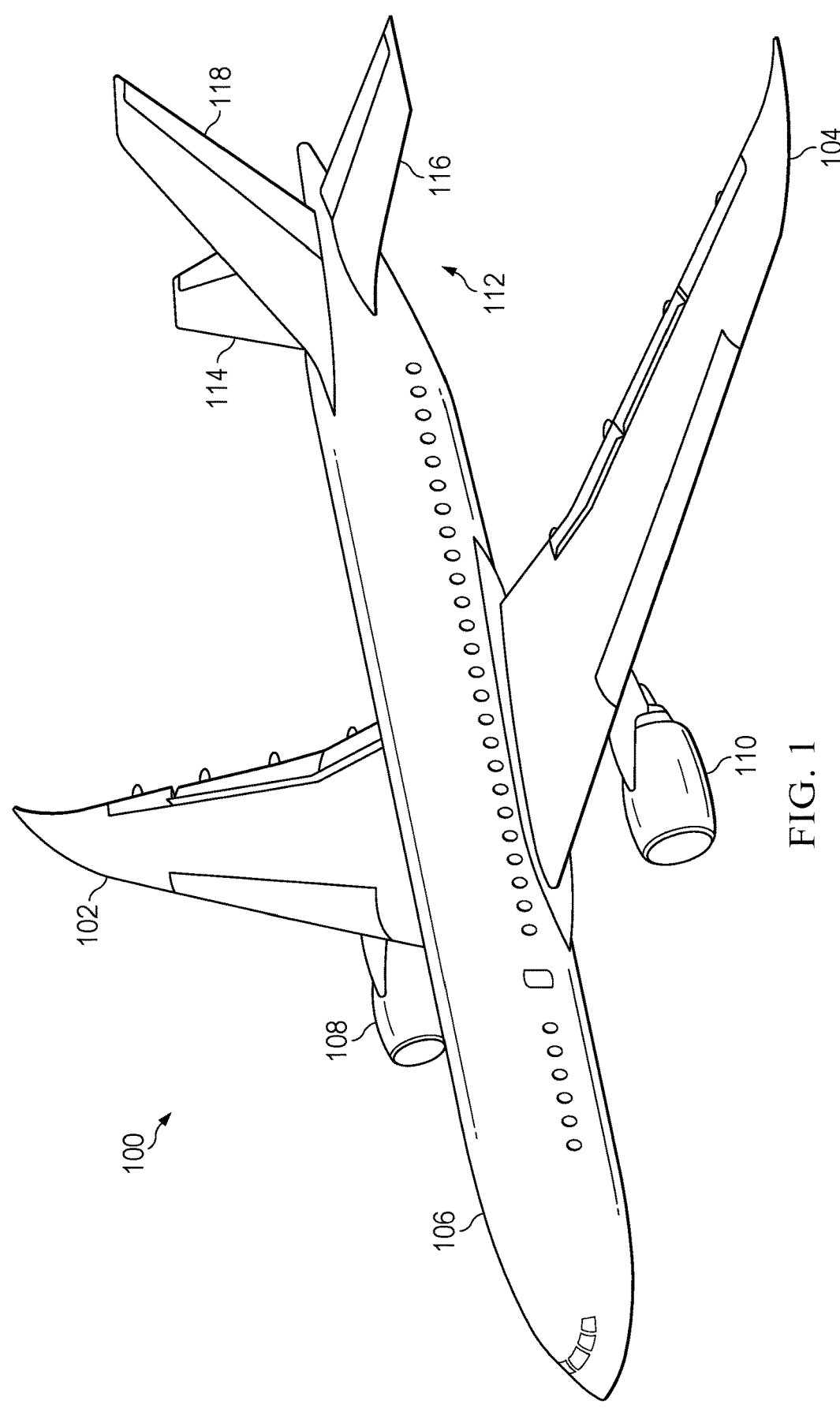
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components that can be manufactured using the methods and tooling of the illustrative examples. For example, blade stringers within aircraft 100 can be formed using the forming and curing tool of the illustrative examples.

Figure 2:
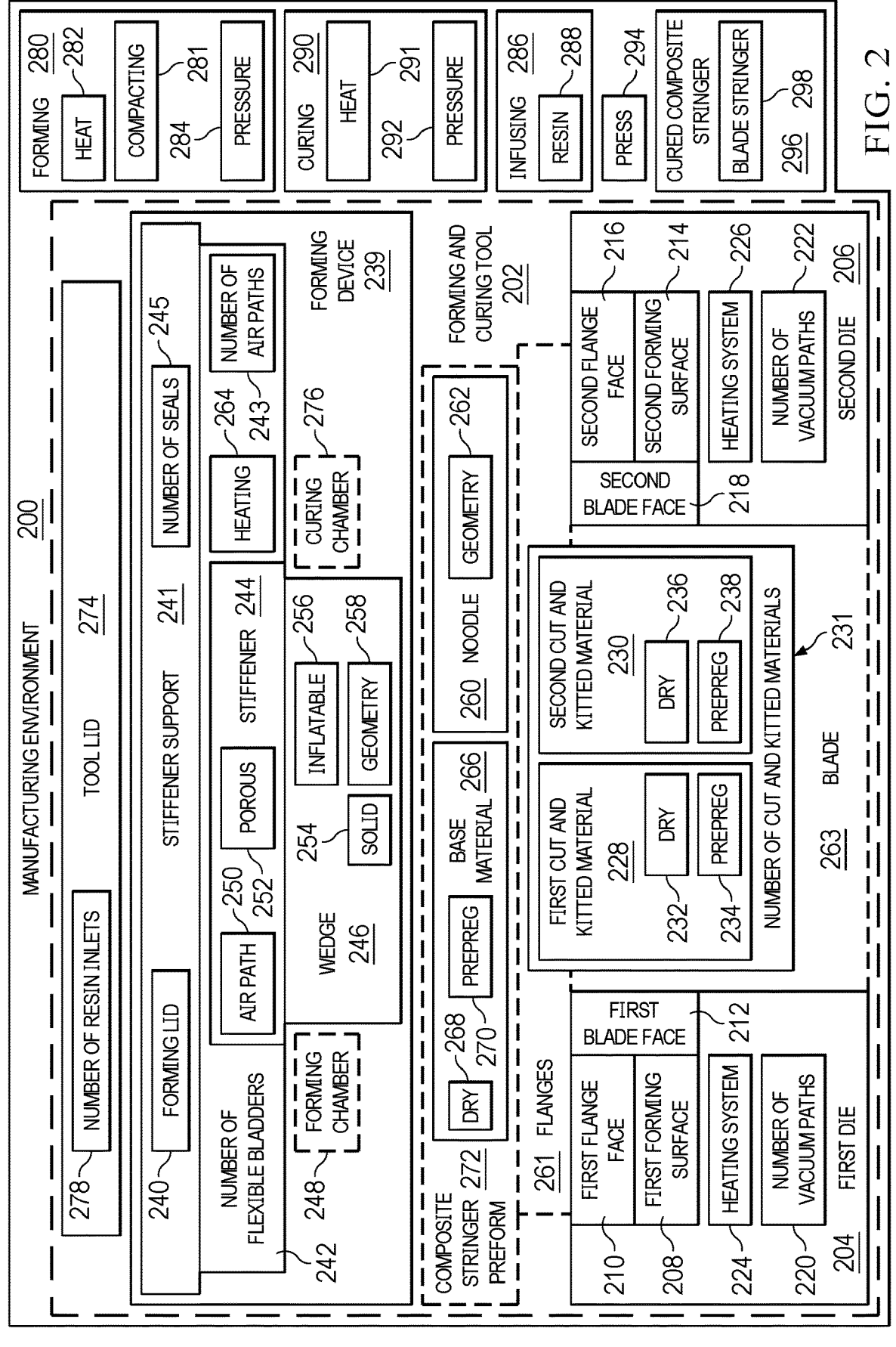
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 can be produced in manufacturing environment 200. Forming and curing tool 202 in manufacturing environment 200 is configured to perform both forming and curing of composite materials to form cured composite stringer 296.

Forming and curing tool 202 for blade stringer 298 comprises first die 204 with first forming surface 208 comprising first blade face 212 and first flange face 210 and number of vacuum paths 220 through the first die; second die 206 with number of vacuum paths 222 and second forming surface 214 comprising second blade face 218 and second flange face 216; and number of flexible bladders 242 positioned above first die 204 and second die 206 and configured to simultaneously form number of cut and kitted materials 231 and then simultaneously compress first cut and kitted material 228 of number of cut and kitted materials 231 against first flange face 210 and second cut and kitted material 230 of number of cut and kitted materials 231 against second flange face 216. Second die 206 is configured to clamp number of cut and kitted materials 231 between first forming surface 208 and second forming surface 214.

First cut and kitted material 228 is in contact with first blade face 212 during forming 280 and curing 290. Second cut and kitted material 230 is in contact with second blade face 218 during forming 280 and curing 290.

First cut and kitted material 228 and second cut and kitted material 230 are clamped between first blade face 212 and second blade face 218 prior to forming. First cut and kitted material 228 can take any desirable form. In some illustrative examples, first cut and kitted material 228 is dry 232. In some illustrative examples, first cut and kitted material 228 is formed of prepreg 234. Second cut and kitted material 230 can take any desirable form. In some illustrative examples, second cut and kitted material 230 is dry 236. In some illustrative examples, second cut and kitted material 230 is formed of prepreg 238.

Clamping comprises applying controlled pressure for forming blade 263 of blade stringer 298. Blade 263 comprises a portion of first cut and kitted material 228 and a portion of second cut and kitted material 230.

Flanges 261 of blade stringer 298 are formed by placing first cut and kitted material 228 in contact with first flange face 210 and placing second cut and kitted material 230 in contact with second flange face 216. After clamping first cut and kitted material 228 and second cut and kitted material 230 between first blade face 212 and second blade face 218, first cut and kitted material 228 is formed onto first flange face 210 of first forming surface 208 and second cut and kitted material 230 is formed onto second flange face 216 of second forming surface 214. First cut and kitted material 228 is formed onto first flange face 210 of first forming surface 208 and second cut and kitted material 230 is formed onto second flange face 216 of second forming surface 214 while first cut and kitted material 228 and second cut and kitted material 230 are clamped between first forming surface 208 and second forming surface 214.

Forming 280 first cut and kitted material 228 onto first flange face 210 and forming 280 second cut and kitted material 230 onto second flange face 216 comprises lowering wedge 246 between first cut and kitted material 228 and second cut and kitted material 230. By lowering wedge 246 between first cut and kitted material 228 and second cut and kitted material 230, portions of first cut and kitted material 228 and second cut and kitted material 230 move away from each other.

In some illustrative examples, a parting plane is present between first cut and kitted material 228 and second cut and kitted material 230. The parting plane allows for gliding/shear of wedge 246. In some illustrative examples, the parting plane is formed of a number of films. In some illustrative examples, the parting plane is formed of a polymeric material. In some illustrative examples, the parting plane is formed of fluorinated ethylene propylene (FEP). In some illustrative examples, the parting plane is formed of a porous Polytetrafluoroethylene (PTFE) composite, such as a porous PTFE glass composite. In some illustrative examples, the parting plane material is removed after forming 280, including compacting 281, first cut and kitted material 228 and second cut and kitted material 230.

Forming 280 first cut and kitted material 228 onto first flange face 210 and forming second cut and kitted material 230 onto second flange face 216 further comprises inflating number of flexible bladders 242. Number of flexible bladders 242 is connected to wedge 246. In some illustrative examples, forming and curing tool 202 for blade stringer 298 comprises forming lid 240, stiffener 244 connected to and perpendicular to forming lid 240, number of flexible bladders 242 surrounding stiffener 244, and wedge 246 connected to stiffener 244.

Stiffener 244 provides support for wedge 246 as it moves between first cut and kitted material 228 and second cut and kitted material 230. Wedge 246 initiates forming 280 of first cut and kitted material 228 and second cut and kitted material 230. Wedge 246 also forms a position for noodle 260 in blade stringer 298. In some illustrative examples, geometry 258 of wedge 246 is the same as geometry 262 of noodle 260. In some illustrative examples, wedge 246 has geometry 262 of noodle 260 to be placed in blade stringer 298. In some illustrative examples, wedge 246 creates a radius in composite stringer preform 272 that has a same radius as noodle 260. In some illustrative examples, stiffener 244 acts as a locating feature for wedge 246.

In some illustrative examples, wedge 246 is solid 254. In some illustrative examples, wedge 246 is inflatable 256. When wedge 246 is inflatable 256, geometry 258 can change during use of wedge 246.

Number of flexible bladders 242 are inflated to complete forming 280 of first cut and kitted material 228 and second cut and kitted material 230. Number of flexible bladders 242 are flexible enough to be inflated. Number of flexible bladders 242 are flexible enough to conform to first cut and kitted material 228 and second cut and kitted material 230.

Stiffener 244 can be formed of any desirable material. In some illustrative examples, stiffener 244 is porous 252. In some illustrative examples, stiffener 244 comprises air path 250 to aid in compacting 281 during forming 280. In some illustrative examples, number of flexible bladders 242 comprises a number of air paths 243 for compacting 281 components of blade stringer 298.

In some illustrative examples, wedge 246 and number of flexible bladders 242 are connected to forming lid 240. In some illustrative examples, lowering wedge 246 between first cut and kitted material 228 and second cut and kitted material 230 is done as forming lid 240 is lowered towards first die 204 and second die 206.

By forming 280 first cut and kitted material 228 and second cut and kitted material 230 against first forming surface 208 and second forming surface 214, blade 263 and flanges 261 of blade stringer 298 are formed. First cut and kitted material 228 and second cut and kitted material 230 are compacted against first forming surface 208 and second forming surface 214 during forming 280.

First cut and kitted material 228 and second cut and kitted material 230 are compacted during forming 280 by applying heat 282 and pressure 284. Pressure 284 is applied by inflating number of flexible bladders 242. Pressure 284 is also applied by moving at least one of first die 204 or second die 206 towards the other of first die 204 and second die 206.

In some illustrative examples, heat 282 is applied using integral heating in first die 204 and second die 206. As depicted, first die 204 and second die 206 are integrally heated. As depicted, integral heating comprises heating system 224 and heating system 226.

The integral heating in first die 204, heating system 224, can take any desirable form. In some illustrative examples, heating system 224 can comprise at least one of liquid, electric, inductive, or steam heating.

The integral heating in second die 206, heating system 226, can take any desirable form. In some illustrative examples, heating system 226 can comprise at least one of liquid, electric, inductive, or steam heating.

In some illustrative examples, heat 282 is applied using number of flexible bladders 242. In some illustrative examples, to complete forming 280 of first cut and kitted material 228 and second cut and kitted material 230, number of flexible bladders 242 is fully pressurized and heated. Heating 264 of number of flexible bladders 242 can be done by inflating with heated air. In some illustrative examples, number of flexible bladders 242 comprises a heated bladder membrane to perform heating 264 by number of flexible bladders 242.

During the compacting 281 in forming 280, vacuum is applied to first cut and kitted material 228 and second cut and kitted material 230 through number of vacuum paths 220 and number of vacuum paths 222. While pressure 284 and heat 282 are applied to first cut and kitted material 228 and second cut and kitted material 230, air and moisture are removed from first cut and kitted material 228 and second cut and kitted material 230. Air and moisture are removed using number of vacuum paths 220 and number of vacuum paths 222. Applying pressure 284 can include applying positive pressure 284 or negative pressure 284. Applying pressure 284 can include applying pressure by pressing first cut and kitted material 228 and second cut and kitted material 230 with a tooling component. In this example, positive pressure is applied to the tooling component to press first cut and kitted material 228 and second cut and kitted material 230. When a vacuum is applied to first cut and kitted material 228 and second cut and kitted material 230, applying the vacuum is a form of applying pressure 284 during forming 280. In these examples, a negative pressure is applied to first cut and kitted material 228 and second cut and kitted material 230.

Forming chamber 248 is formed by sealing forming lid 240 to first die 204 and second die 206. In some illustrative examples, number of seals 245 on forming lid 240 is configured to seal forming lid 240 to a number of dies. In this illustrative example, the number of dies includes first die 204 and second die 206. In other illustrative examples, a number of seals is present on first die 204 and second die 206 instead of forming lid 240.

After forming 280 flanges 261 and blade 263 in first cut and kitted material 228 and second cut and kitted material 230, forming device 239 is removed from first die 204 and second die 206. To remove forming device 239, number of flexible bladders 242 is at least partially deflated. In some illustrative examples, number of flexible bladders 242 is cooled. In other illustrative examples, number of flexible bladders 242 is allowed to cool naturally.

First die 204 and second die 206 are heated with any viable method. For isothermal or semi-isothermal processes, maintaining temperature of first die 204 and second die 206 will be more sustainable/lower heat usage than continually cooling and heating first die 204 and second die 206. By allowing first die 204 and second die 206 to remain hot, thermal ramps are reduced. In some illustrative examples, first die 204 and second die 206 remain at a forming temperature. In some illustrative examples, first die 204 and second die 206 remain at an infusion temperature. Thermal ramps are reduced by not moving the preform between separate forming tools and infusion and curing tools. Energy consumption is reduced by not moving the preform between separate forming tools and infusion and curing tools. Energy consumption is reduced by heating a single forming and curing tool instead of separate forming and curing tools.

After removing forming device 239, noodle 260 and base material 266 are placed over first cut and kitted material 228 and second cut and kitted material 230. Base material 266 can take the form of one of dry 268 material or prepreg 270. When base material 266 is dry 268, resin 288 will be infused into base material 266 prior to curing 290.

Base material 266, noodle 260, first cut and kitted material 228, and second cut and kitted material 230 form composite stringer preform 272. After placing base material 266 and noodle 260, tool lid 274 is lowered into contact with first die 204 and second die 206. Tool lid 274 is sealed to first die 204 and second die 206 to form curing chamber 276. Prior to curing 290 composite stringer preform 272, forming 280 is performed on base material 266. Compacting 281 of base material 266 and noodle 260 is performed with base material 266 and noodle 260 in contact with first cut and kitted material 228 and second cut and kitted material 230. Tool lid 274 is pressed against base material 266 during forming 280 of base material 266.

During forming 280 of base material 266, composite stringer preform 272 is compacted. Heat and pressure are applied to composite stringer preform 272 to compact composite stringer preform 272. During compaction, air and moisture is removed from composite stringer preform 272. A vacuum is applied to curing chamber 276 to remove air and moisture from composite stringer preform 272.

In some illustrative examples, infusing 286 of resin 288 is performed prior to curing 290. In some illustrative examples, resin 288 is infused into composite stringer preform 272 prior to curing 290. Infusing 286 resin 288 into first cut and kitted material 228, second cut and kitted material 230, noodle 260, and base material 266 to form composite stringer preform 272 is performed while first cut and kitted material 228 is in contact with first forming surface 208 and second cut and kitted material 230 is in contact with second forming surface 214.

In some illustrative examples, infusing 286 is optional. In some illustrative examples, first cut and kitted material 228 is prepreg 234, second cut and kitted material 230 is prepreg 238, and base material 266 is prepreg 270. In these illustrative examples, forming 280 base material 266 in curing chamber 276 forms composite stringer preform 272.

Composite stringer preform 272 is cured to form blade stringer 298. Curing 290 includes application of heat 291 and pressure 292. Pressure 292 is controlled to provide desired pressure 292 for curing.

Applying pressure 292 can include applying positive pressure 292 or negative pressure 292. Applying pressure 292 can include applying pressure by pressing at least one of base material 266, first cut and kitted material 228, or second cut and kitted material 230 with a tooling component. When a vacuum is applied to at least one of base material 266, noodle 260, first cut and kitted material 228, or second cut and kitted material 230, applying the vacuum is a form of applying pressure 292 during forming 280.

Forming and curing tool 202 for blade stringer 298 comprises stiffener support 241, stiffener 244 connected to and perpendicular to stiffener support 241, number of flexible bladders 242 surrounding stiffener 244, and wedge 246 connected to stiffener 244. In some illustrative examples, stiffener support 241 takes the form of forming lid 240. Stiffener support 241 provides a connection between forming device 239 and a movement device, such as press 294.

Both forming 280 and curing 290 is performed with elevated temperature and pressure. Temperatures for forming 280 can range from 120 degrees Fahrenheit to 350 degrees Fahrenheit. Temperatures for curing 290 range from 250 degrees Fahrenheit to 400 degrees Fahrenheit.

Sealing surfaces are included for vacuum integrity between the number of dies, first die 204 and second die 206, and tool lid 274. In some illustrative examples, seals are also present between first die 204 and second die 206.

First die 204 and second die 206 are used to form blade stringer 298 for a specific location in a structure, such as aircraft 100. Blade stringer 298 will have a complex curvature based upon a desired location. Each blade stringer in a structure will have its own complex curvature based on a respective location for the respective blade stringer in the structure. Forming and curing tool 202 is designed to create the complex curvature for blade stringer 298. Additional forming and curing tools will be created and used to create blade stringers with different complex curvatures in the same structure, such as aircraft 100.

Tool components, including at least one of first die 204, second die 206, forming lid 240, and tool lid 274, are capable of withstanding up to 200 PSI internal pressure while maintaining seal/vacuum integrity and internal surface profile tolerance within 0.010" of nominal. The location of number of resin inlets, number of vacuum paths 220, and number of vacuum paths 222 is based on design of blade stringer 298, type of resin 288, and other characteristics of infusing 286 resin 288.

Press 294 can be used to hold and move portions of forming and curing tool 202. For example, press 294 can hold and move first die 204 and second die 206 relative to each other. Press 294 can provide horizontal movement of at least one of first die 204 or second die 206 relative to each other to provide clamping and pressure 284 for forming 280. Press 294 can provide vertical movement of forming device 239 relative to first die 204 and second die 206 to perform forming 280 of first cut and kitted material 228 and second cut and kitted material 230. Press 294 can provide vertical movement of forming device 239 to remove forming device 239 after forming 280. Press 294 can provide vertical movement of tool lid 274 to form curing chamber 276 and perform forming 280 of base material 266.

The provided process and forming and curing tool 202 moves smoothly and quickly from step to step. Automation decreases instances of technicians handling heated parts. Automation can include the use of pick and place systems for placing materials for composite stringer preform 272. Automation can include the movement of components of forming and curing tool 202 including at least one of first die 204, second die 206, stiffener support 241, and tool lid 274.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of resin inlets 278 is depicted in tool lid 274, in some illustrative examples a number of resin inlets is also present in at least one of first die 204 or second die 206. Although the number of dies depicted in forming and curing tool 202, in some other illustrative examples, a single die is present. More than one die is more desirable for cleaning, but a single die can have other advantages.

Although not depicted in FIG. 2, locating and indexing features can be present. In some illustrative examples, there are indexing features present for the pick and place (PnP) equipment carrying the materials such as first cut and kitted material 228, second cut and kitted material 230, noodle 260, and base material 266. In some illustrative examples, indexing features are present between components of forming and curing tool 202 and press 294. In some illustrative examples, indexing features can include at least one of mechanical or visual targets. Mechanical features can include pins, grooves, slots, or other desirable physical features. Visual targets can include optical tooling points for vision system recognition. In some illustrative examples, indexing features are present between the different components of forming and curing tool 202 such as first die 204 and second die 206.

In some illustrative examples, locating for the materials, first cut and kitted material 228 and second cut and kitted material 230, is present on the tools, first die 204 and second die 206.

First cut and kitted material 228 and second cut and kitted material 230 can be loaded in a direction into tool with minimal margin outside of Manufacturing Edge of Part (MEOP). The manufacturing edge of part typically includes a margin that is trimmed in a later step prior to assembly. In some manufacturing processes indexing features are included into an edge of a part. In this illustrative example, locating features are not used because the cut and kitted materials can be manufactured to the size of the recess in the tool. For example, base material 266 can be manufactured to dimensions of the width and length of curing chamber 276.

Figure 3:
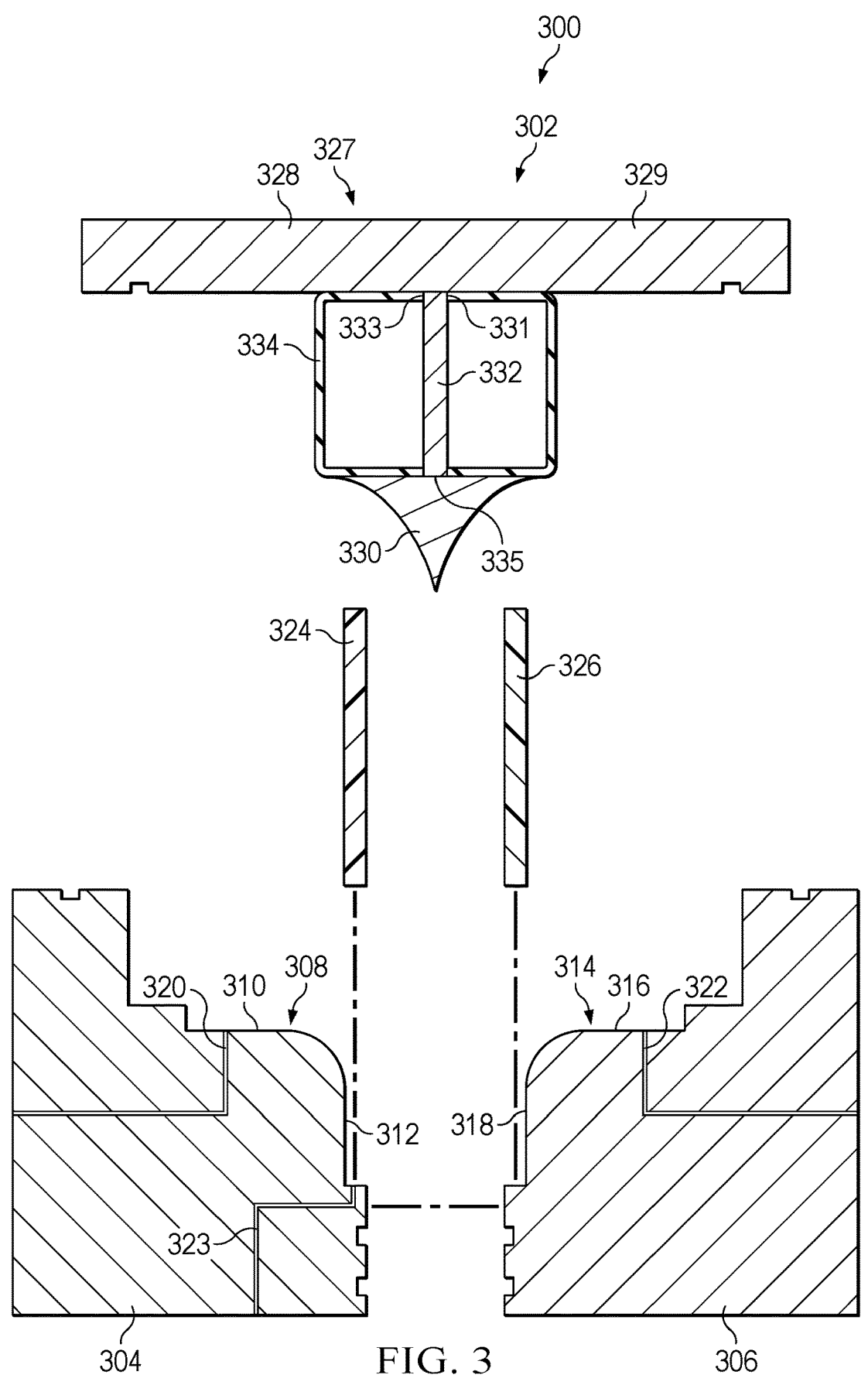
FIG. 3 is an illustration of a cross-sectional view of a forming and curing tool in accordance with an illustrative embodiment.

Turning now to FIG. 3, an illustration of a cross-sectional view of a forming and curing tool is depicted in accordance with an illustrative embodiment. In view 300, forming and curing tool 302 is present. Forming and curing tool 302 comprises first die 304 and second die 306. First die 304 has first forming surface 308. First forming surface 308 comprises first flange face 310 and first blade face 312. Second die 306 has second forming surface 314. Second forming surface 314 comprises second flange face 316 and second blade face 318. Second die 306 is configured to clamp a number of cut and kitted materials between first forming surface 308 and second forming surface 314.

First die 304 further comprises number of vacuum paths 320 through first die 304. Second die 306 further comprises number of vacuum paths 322 through second die 306.

In this illustrative example, first cut and kitted material 324 and second cut and kitted material 326 are present. First cut and kitted material 324 and second cut and kitted material 326 can be formed against first forming surface 308 and second forming surface 314 to form flanges and a blade of a blade stringer.

Forming device 327 is lowered towards first cut and kitted material 324 and second cut and kitted material 326 to form first cut and kitted material 324 and second cut and kitted material 326. Forming device 327 comprises stiffener support 329. In this illustrative example, stiffener support 329 takes the form of forming lid 328.

Forming device 327 comprises forming lid 328, wedge 330, stiffener 332, and number of flexible bladders 334. Forming lid 328 and attached forming components will be used to form first cut and kitted material 324 and second cut and kitted material 326. Wedge 330 is connected to 335 forming lid 328 by stiffener 332. Stiffener 332 is connected to 331 and perpendicular to 333 forming lid 328. Number of flexible bladders 334 surrounds stiffener 332.

Figure 4:
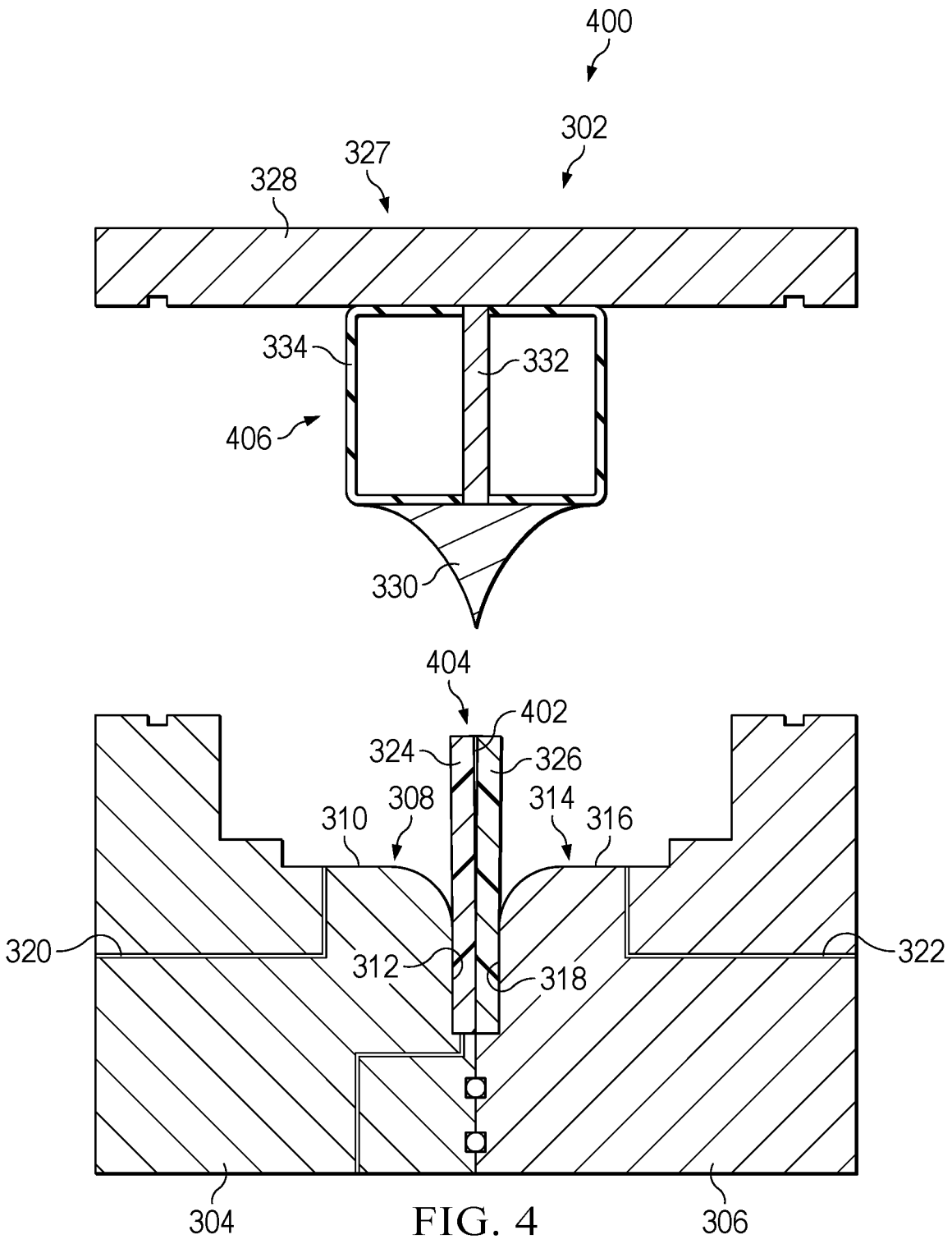
FIG. 4 is an illustration of a cross-sectional view of a forming and curing tool clamping a first cut and kitted material and a second cut and kitted material in accordance with an illustrative embodiment.

Turning now to FIG. 4, an illustration of a cross-sectional view of a forming and curing tool clamping a first cut and kitted material and a second cut and kitted material is depicted in accordance with an illustrative embodiment. In view 400, at least one of first die 304 or second die 306 has been moved towards the other of first die 304 or second die 306. In view 400, first cut and kitted material 324 and second cut and kitted material 326 have been clamped 404 between first die 304 and second die 306. More specifically, first cut and kitted material 324 and second cut and kitted material 326 have been clamped between first forming surface 308 and second forming surface 314.

First die 304 and second die 306 are closed with pressure sufficient to compact a blade of the resulting stiffener. Parting plane 402 is present between first cut and kitted material 324 and second cut and kitted material 326. Parting plane 402 allows for gliding/shear of wedge 330 and number of flexible bladders 334. In some illustrative examples, parting plane 402 is formed of a polymeric material. In some illustrative examples, parting plane 402 is formed of fluorinated ethylene propylene (FEP). In some illustrative examples, parting plane 402 is formed of a porous Polytetrafluoroethylene (PTFE) composite, such as a porous PTFE glass composite.

In view 400, forming and curing tool 302 has been positioned to begin forming first cut and kitted material 324 and second cut and kitted material 326. Forming lid 328 has been positioned over parting plane 402 such that wedge 330 can be lowered between first cut and kitted material 324 and second cut and kitted material 326. In view 400, number of flexible bladders 334 are uninflated 406.

Figure 5:
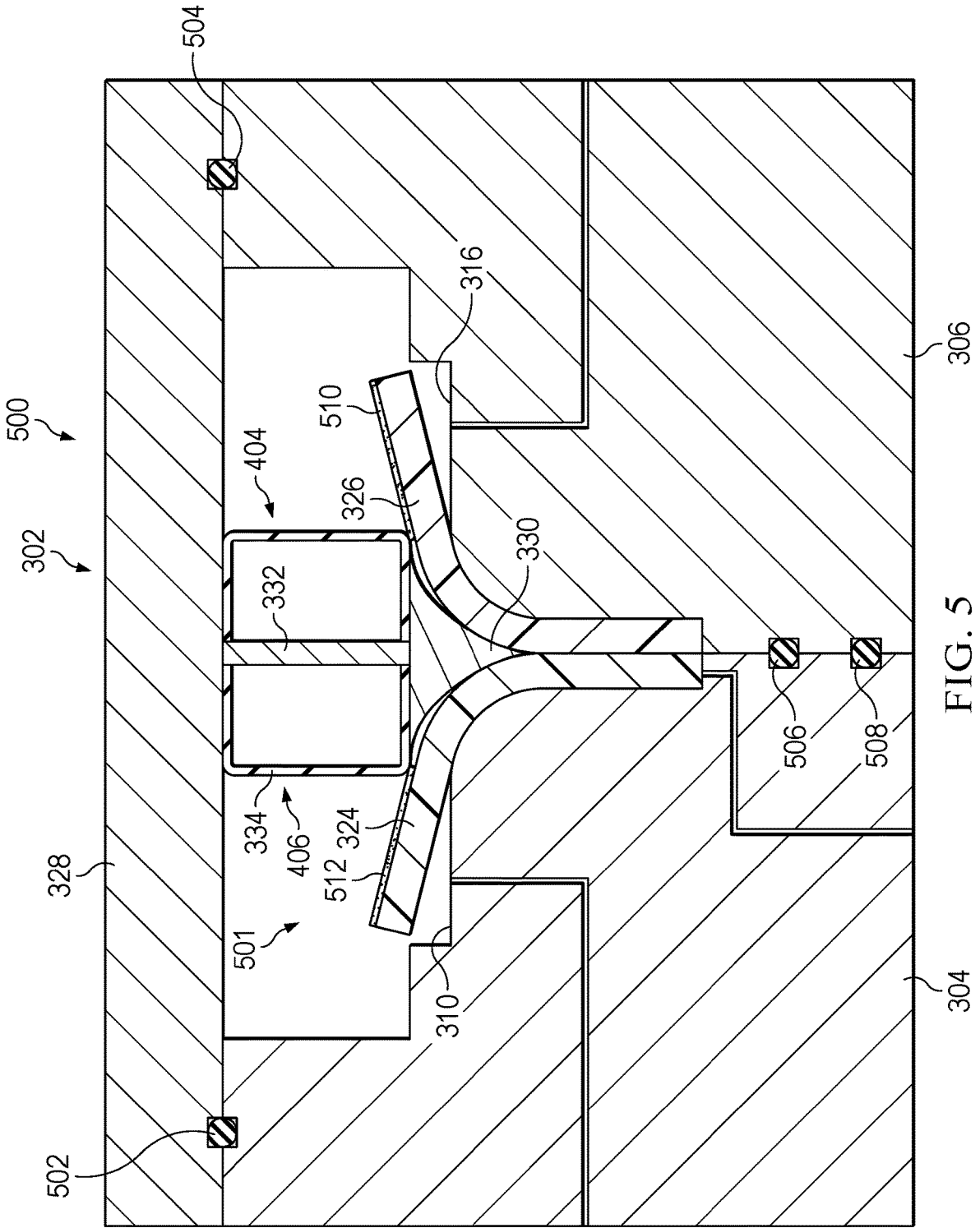
FIG. 5 is an illustration of a cross-sectional view of a forming and curing tool forming a first cut and kitted material and a second cut and kitted material in accordance with an illustrative embodiment.

Turning now to FIG. 5, an illustration of a cross-sectional view of a forming and curing tool forming a first cut and kitted material and a second cut and kitted material is depicted in accordance with an illustrative embodiment. In view 500, forming lid 328 has been lowered to form forming chamber 501. Seal 502 seals forming lid 328 to first die 304. Seal 504 seals forming lid 328 to second die 306. Seal 506 and seal 508 seal first die 304 to second die 306.

In view 500 wedge 330 has been lowered between first cut and kitted material 324 and second cut and kitted material 326. Parting plane 402 allows for gliding of wedge 330 between first cut and kitted material 324 and second cut and kitted material 326. In view 500, film 510 and film 512 of parting plane 402 allow for gliding of wedge 330.

In view 500, wedge 330 has begun forming first cut and kitted material 324 and second cut and kitted material 326. In view 500, number of flexible bladders 334 remain in uninflated 406 state.

Stiffener 332 provides support to wedge 330 as it moves between first cut and kitted material 324 and second cut and kitted material 326. Stiffener 332 maintains a constant distance between wedge 330 and forming lid 328.

In view 500, forming device 327 including wedge 330, stiffener 332, and forming lid 328 has been lowered into a forming position. Wedge 330 forms a radius for a filler. Wedge 330 begins to spread begins to spread first cut and kitted material 324 and second cut and kitted material 326.

In view 500, first die 304 and second die 306 have been closed with controlled pressure to hold portions of first cut and kitted material 324 and second cut and kitted material 326 while a radius is formed in each respective cut and kitted material. In some illustrative examples, first die 304 and second die 306 have been closed with controlled pressure to compact a blade portion.

Figure 6:
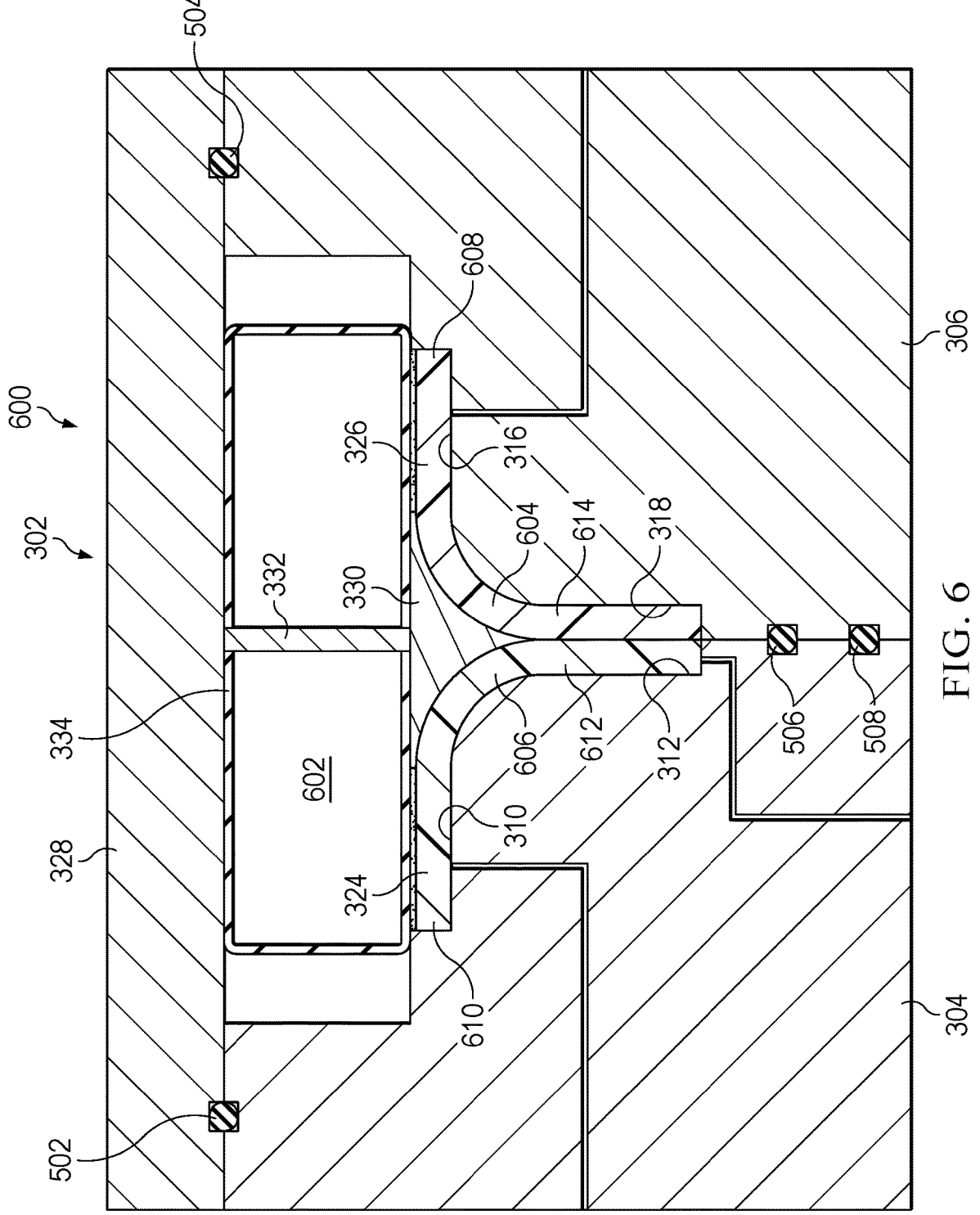
FIG. 6 is an illustration of a cross-sectional view of a forming and curing tool forming a first cut and kitted material and a second cut and kitted material in accordance with an illustrative embodiment.

Turning now to FIG. 6, an illustration of a cross-sectional view of a forming and curing tool forming a first cut and kitted material and a second cut and kitted material is depicted in accordance with an illustrative embodiment. In view 600, number of flexible bladders 334 is in inflated 602 state. In view 600, number of flexible bladders 334 has formed first cut and kitted material 324 and second cut and kitted material 326 against first die 304 and second die 306. More specifically, number of flexible bladders 334 has formed first cut and kitted material 324 against first forming surface 308. Number of flexible bladders 334 has formed second cut and kitted material 326 against second forming surface 314.

Number of flexible bladders 334 has been pressurized internally to expand. Expanding number of flexible bladders 334 forms flanges and applies pressure for debulk. Number of flexible bladders 334 is inflated to apply pressure to first cut and kitted material 324 and second cut and kitted material 326 as number of flexible bladders 334 fold open.

In view 600, radius 604 has been formed into second cut and kitted material 326. In view 600, radius 606 has been formed into first cut and kitted material 324. Flange portion 608 has been formed in second cut and kitted material 326. Flange portion 608 is formed against second flange face 316. Flange portion 610 has been formed in first cut and kitted material 324. Flange portion 610 is formed against first flange face 310.

In view 600, first die 304 and second die 306 apply pressure sufficient to compact portions of first cut and kitted material 324 and second cut and kitted material 326 into a blade for a composite stringer. Blade portion 612 of first cut and kitted material 324 is formed against first blade face 312. Blade portion 614 of second cut and kitted material 324 is formed against second blade face 318.

The blade of the blade stringer, including blade portion 612 and blade portion 614, is clamped between a first die 304 and a second die 306. Flange portions, flange portion 610 and flange portion 608, of the blade stringer are simultaneously formed onto first die 304 and second die 306 while the blade is clamped.

Figure 7:
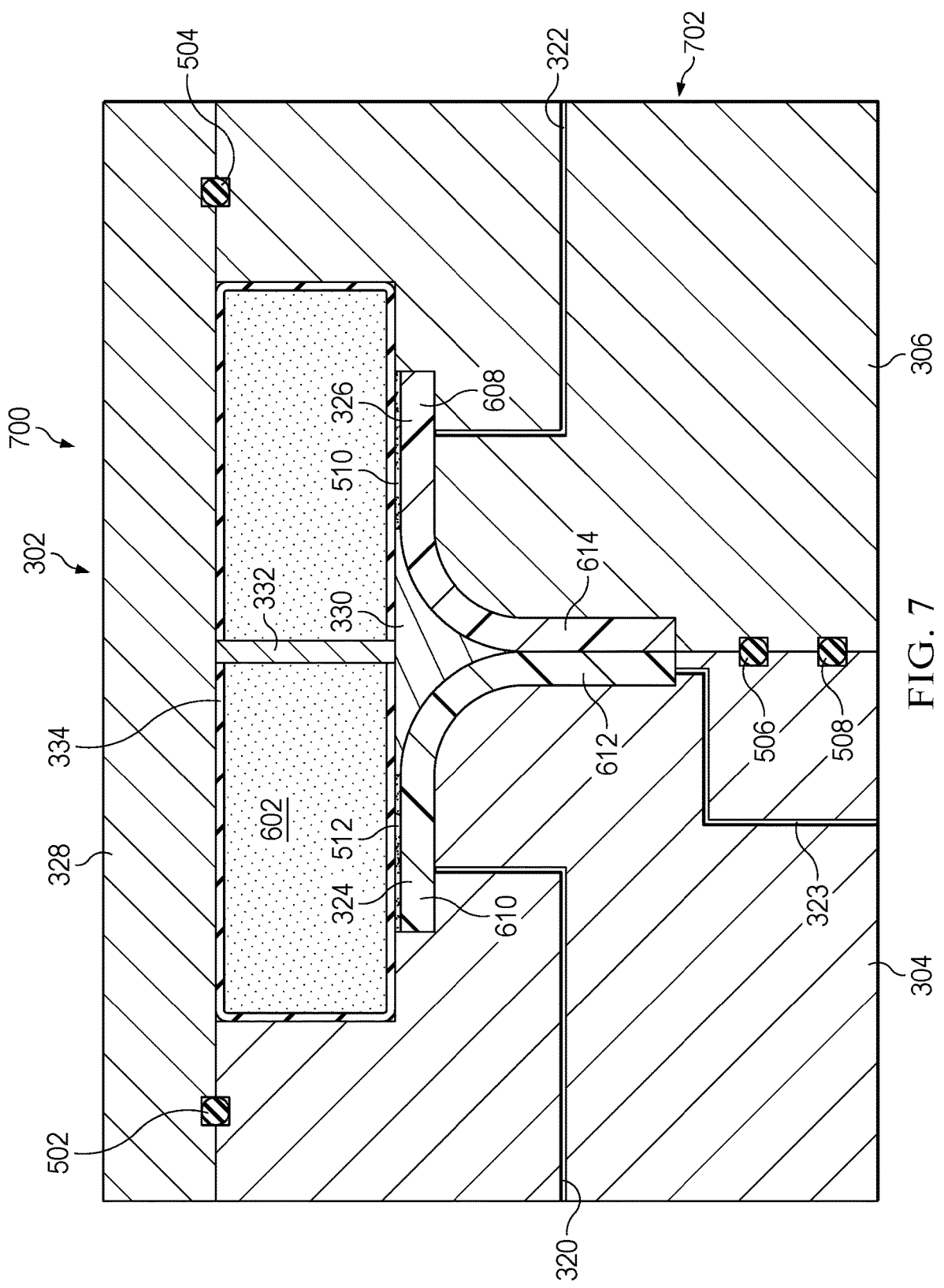
FIG. 7 is an illustration of a cross-sectional view of a forming and curing tool compacting a first cut and kitted material and a second cut and kitted material in accordance with an illustrative embodiment.

Turning now to FIG. 7, an illustration of a cross-sectional view of a forming and curing tool compacting a first cut and kitted material and a second cut and kitted material is depicted in accordance with an illustrative embodiment. In view 700, number of flexible bladders 334 is inflated 602. While number of flexible bladders 334 is inflated 602 to a desired pressure for compaction, heat is applied to first cut and kitted material 324 and second cut and kitted material 326. In some illustrative examples, first die 304 comprises integral heating 702. In some illustrative examples, second die 306 comprises integral heating 702. As depicted, first die 304 and second die 306 are integrally heated.

The integral heating in first die 304 and second die 306 can take any desirable form. In some illustrative examples, integral heating 701 and integral heating 702 can comprise at least one of liquid, electric, inductive, or steam heating.

While pressure and heat are applied to first cut and kitted material 324 and second cut and kitted material 326, first cut and kitted material 324 and second cut and kitted material 326 are compacted. While pressure and heat are applied to first cut and kitted material 324 and second cut and kitted material 326, air and moisture are removed first cut and kitted material 324 and second cut and kitted material 326 via number of vacuum paths 320, number of vacuum paths 322, number of vacuum paths 323.

In some illustrative examples, to complete forming of first cut and kitted material 324 and second cut and kitted material 326, number of flexible bladders 334 is fully pressurized and heated. Heating of number of flexible bladders 334 can be done by inflating with heated air. In some illustrative examples, number of flexible bladders 334 comprises a heated bladder membrane. As number of flexible bladders 334 applies pressure to flange portion 608 and flange portion 610, first die 304 and second die 306 apply pressure to blade portion 612 and blade portion 614. First die 304 and second die 306 are closed with pressure to compact blade portion 612 and blade portion 614.

In this illustrative example, integral vacuum lines are present in first die 304 and second die 306. In this illustrative example, the integral vacuum lines include number of vacuum paths 320 and number of vacuum paths 323 through first die 304 and number of vacuum paths 322 through second die 306. A vacuum is drawn in forming chamber 501 for full compaction and air/moisture removal of first cut and kitted material 324 and second cut and kitted material 326.

In some illustrative examples, a number of vacuum paths is created through film 510 and film 512. In some illustrative examples, film 510 and film 512 are formed of a polymeric material. In some illustrative examples, film 510 and film 512 are formed of fluorinated ethylene propylene (FEP). In some illustrative examples, film 510 and film 512 are formed of a porous Polytetrafluoroethylene (PTFE) composite, such as a porous PTFE glass composite.

By film 510 being porous, a vacuum path between flange portion 608 and number of vacuum paths 322 is created. By film 512 being porous, a vacuum path between flange portion 610 and number of vacuum paths 320 is created. Number of vacuum paths 323 provide vacuum paths to blade portion 612 and blade portion 614. In some illustrative examples, by drawing vacuum in forming chamber 501, first cut and kitted material 324 and second cut and kitted material 326 reach a desired preform thickness.

Although film 510 and film 512 are shown as being present in parting plane 402, in other illustrative examples, film 510 and film 512 may not be present. In other illustrative examples, porous films may be present on the outside of number of flexible bladders 334 to provide for vacuum paths.

Figure 8:
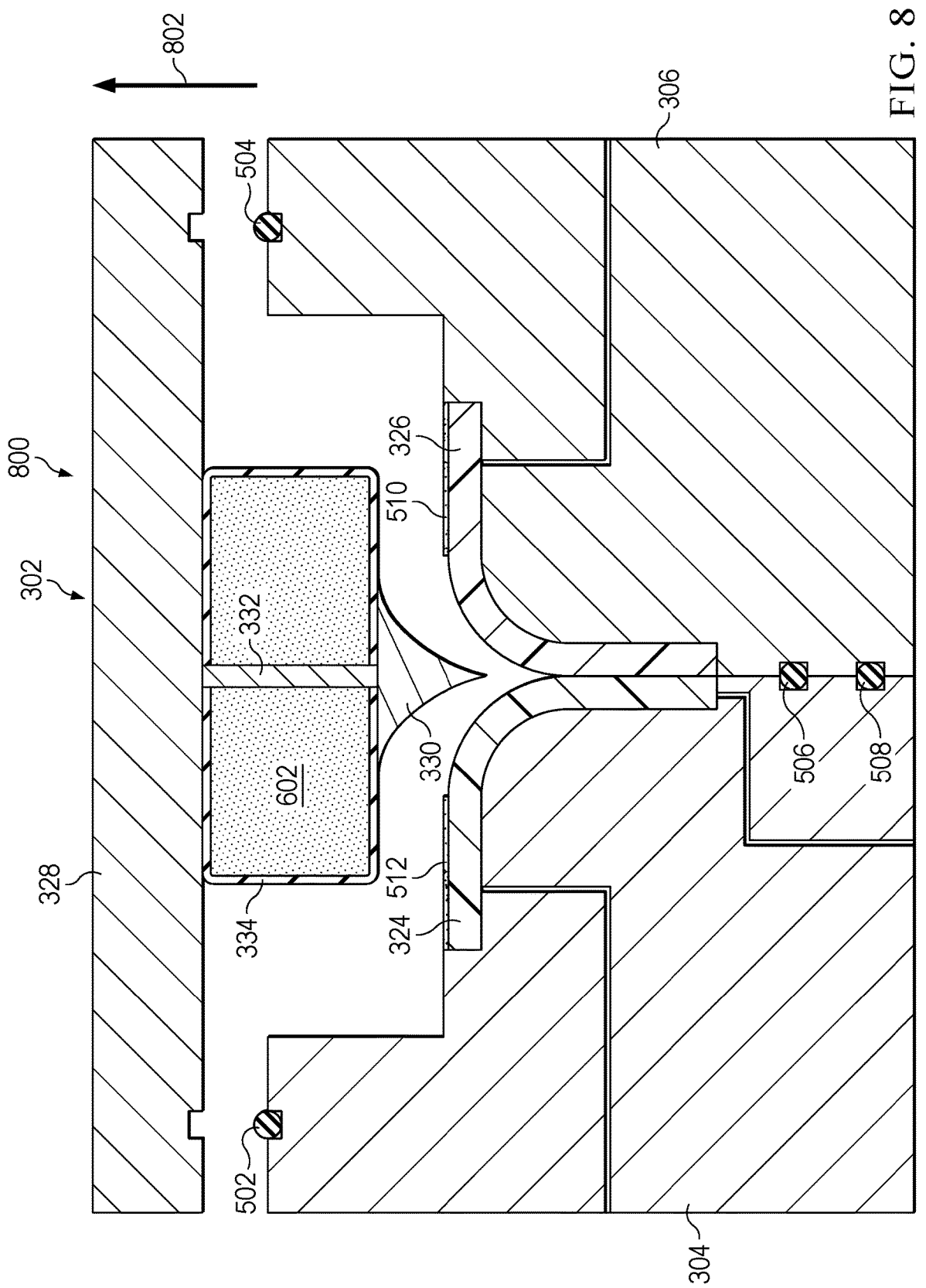
FIG. 8 is an illustration of a cross-sectional view of a forming and curing tool and compacted cut and kitted material in accordance with an illustrative embodiment.

Turning now to FIG. 8, an illustration of a cross-sectional view of a forming and curing tool and compacted cut and kitted material is depicted in accordance with an illustrative embodiment. View 800 is a view of forming lid 328 being removed from first die 304 and second die 306.

Once forming of first cut and kitted material 324 and second cut and kitted material 326 is complete, number of flexible bladders 334 is at least partially deflated. Afterwards, the forming device including number of flexible bladders 334 is removed.

Number of flexible bladders 334 is deflated for removal and allowed to cool naturally. Forming lid 328 is moved in direction 802 to remove forming lid 328, stiffener 332, number of flexible bladders 334, and wedge 330.

In some illustrative examples, first die 304 and second die 306 can remain hot to move to the next forming/infusion step. In some illustrative examples, first die 304 and second die 306 can be cooled for part removal if desired.

After removing forming lid 328, any consumables can be removed. In some illustrative examples, consumable materials include at least one of parting materials or breather. When film 510 and film 512 are present, after removing forming lid 328, film 510 and film 512 can be removed.

Figure 9:
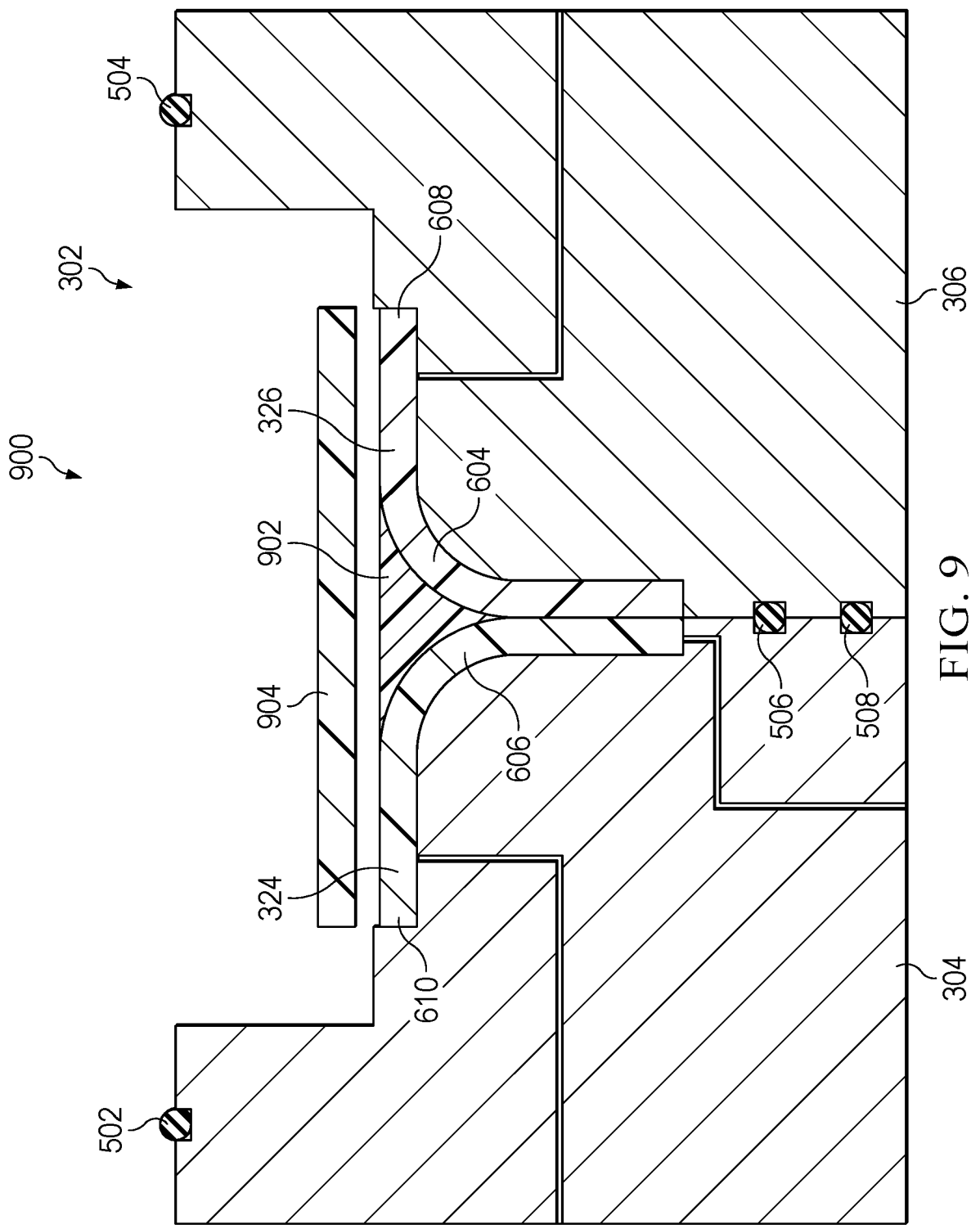
FIG. 9 is an illustration of a cross-sectional view of a forming and curing tool with a noodle and a base material applied over the first cut and kitted material and a second cut and kitted material in accordance with an illustrative embodiment.

Turning now to FIG. 9, an illustration of a cross-sectional view of a forming and curing tool with a noodle and a base material applied over the first cut and kitted material and a second cut and kitted material is depicted in accordance with an illustrative embodiment. In view 900, forming lid 328 and connected forming tooling has been removed from first die 304 and second die 306. In view 900, seal 502 and seal 504 are still present. In other illustrative examples, seal 502 and 504 are part of forming lid 328 and are removed with forming lid 328. In some illustrative examples, seal 502 and seal 504 are consumables and are removed before moving forward with additional processing.

In some illustrative examples, first die 304 and second die 306 remain hot to retain heat for additional processing of first cut and kitted material 324 and second cut and kitted material 326. In some illustrative examples, first die 304 and second die 306 remain hot to retain heat for resin infusion. In some illustrative examples, first die 304 and second die 306 remain hot to retain heat for curing.

In view 900, noodle 902 and base material 904 are placed over and in contact with first cut and kitted material 324 and second cut and kitted material 326. As depicted, noodle 902 is in contact with radius 606 and radius 604. As depicted, base material 904 is placed over noodle 902, flange portion 608, and flange portion 610.

Figure 10:
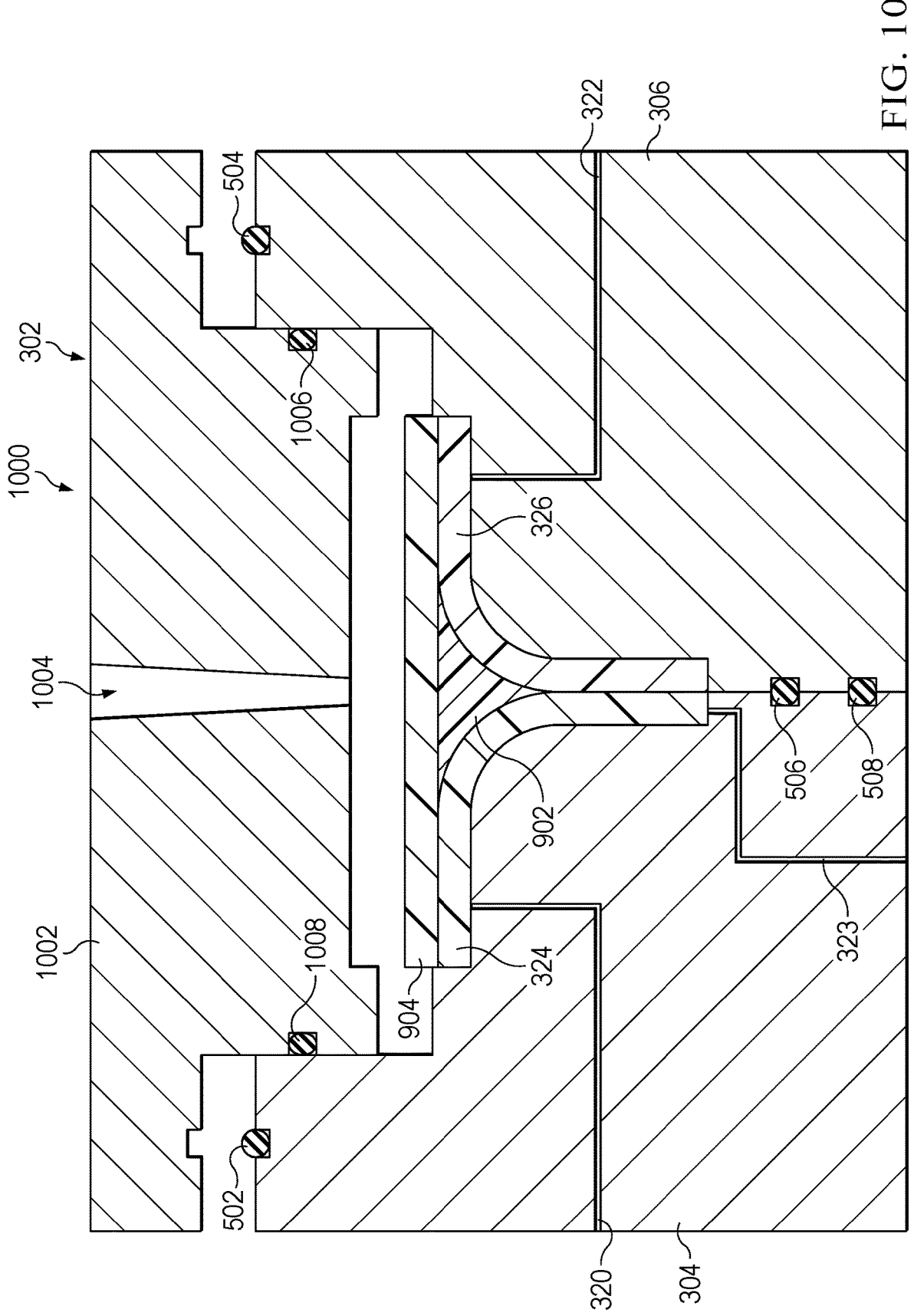
FIG. 10 is an illustration of a cross-sectional view of a tool lid sealed against a first die and a second die in accordance with an illustrative embodiment.

Turning now to FIG. 10, an illustration of a cross-sectional view of a tool lid sealed against a first die and a second die is depicted in accordance with an illustrative embodiment. In view 1000, tool lid 1002 is being lowered and sealed against first die 304 and second die 306. Tool lid 1002 has resin inlet 1004 for resin infusion of base material 904, noodle 902, first cut and kitted material 324, and second cut and kitted material 326. In some illustrative examples, a plug is placed into resin inlet 1004 for curing when base material 904, noodle 902, first cut and kitted material 324, and second cut and kitted material 326 are formed of prepreg. Resin inlet 1004 is optional in some illustrative examples in which base material 904, noodle 902, first cut and kitted material 324, and second cut and kitted material 326 are formed of prepreg.

Tool lid 1002 has seal 1006 and seal 1008 that seal against first die 304 and second die 306. Seal 1006 contacts a different face of second die 306 than seal 504 contacts. Seal 1008 contacts a different face of first die 304 than seal 502 contacts.

Figure 11:
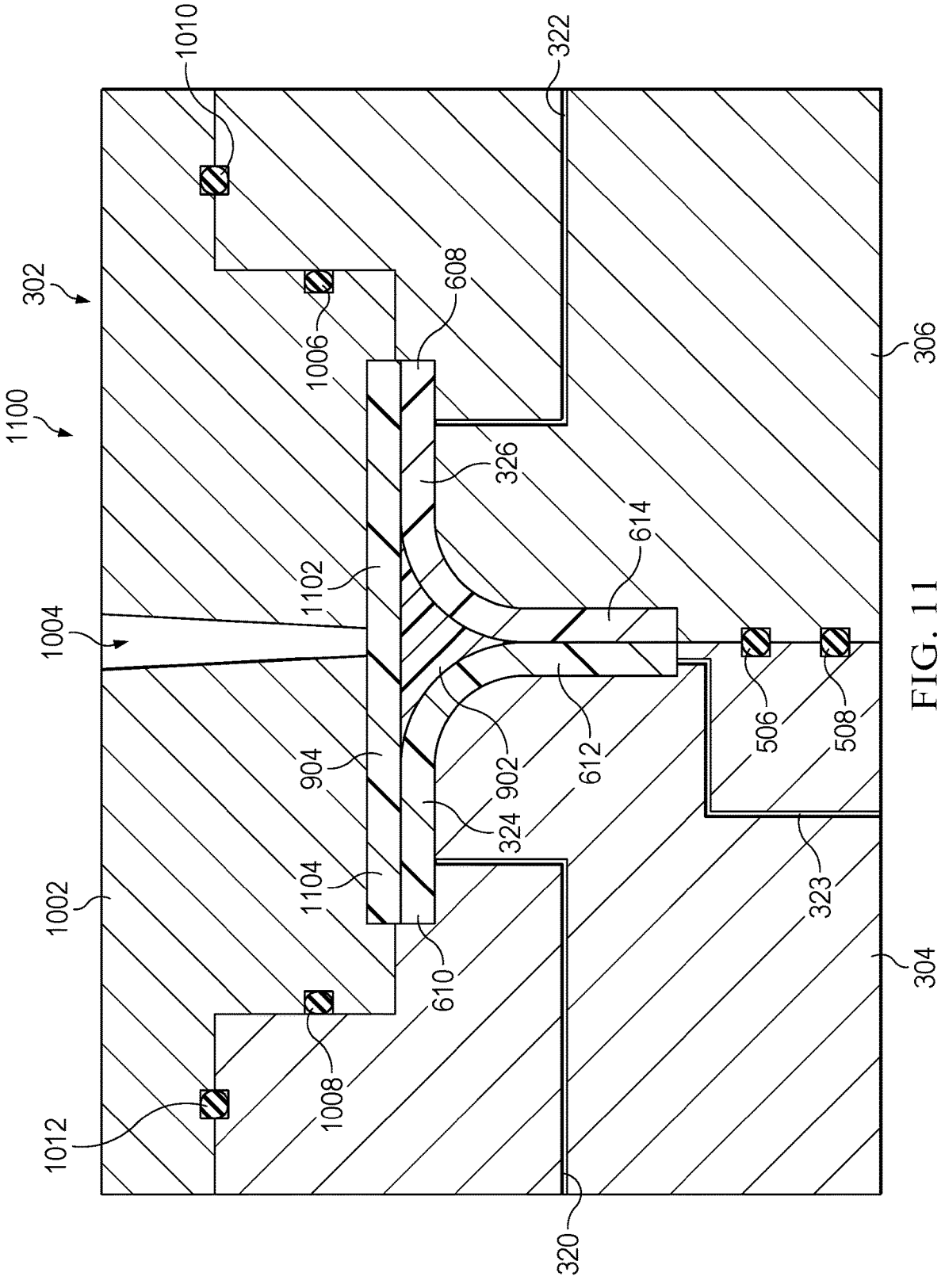
FIG. 11 is an illustration of a cross-sectional view of a tool lid sealed against a first die and a second die in accordance with an illustrative embodiment.

Turning now to FIG. 11, an illustration of a cross-sectional view of a tool lid sealed against a first die and a second die is depicted in accordance with an illustrative embodiment. In view 1100, heat and pressure are applied to base material 904, noodle 902, first cut and kitted material 324, and second cut and kitted material 326.

Pressure against base material 904, noodle 902, flange portion 610, and flange portion 608 is applied by tool lid 1002. Pressure is applied to blade portion 612 and blade portion 614 by first die 304 and second die 306.

Pressure applied using tool lid 1002 and vacuum applied to base material 904, noodle 902, flange portion 610, and flange portion 608 compact and degas the materials prior to further processing. If tool lid 1002 and vacuum applied to base material 904, noodle 902, flange portion 610, and flange portion 608 contain resin, tool lid 1002 and vacuum applied to base material 904, noodle 902, flange portion 610, and flange portion 608 can be referred to as composite stringer preform 1102. Composite stringer preform 1102 comprises base material 904, noodle 902, first cut and kitted material 324, and second cut and kitted material 326.

Tool lid 1002, first die 304, and second die 306 form curing chamber 1104. Forming of base material 904 and noodle 902, and curing of base material 904, noodle 902, first cut and kitted material 324, and second cut and kitted material 326 is performed in curing chamber 1104.

Figure 12:
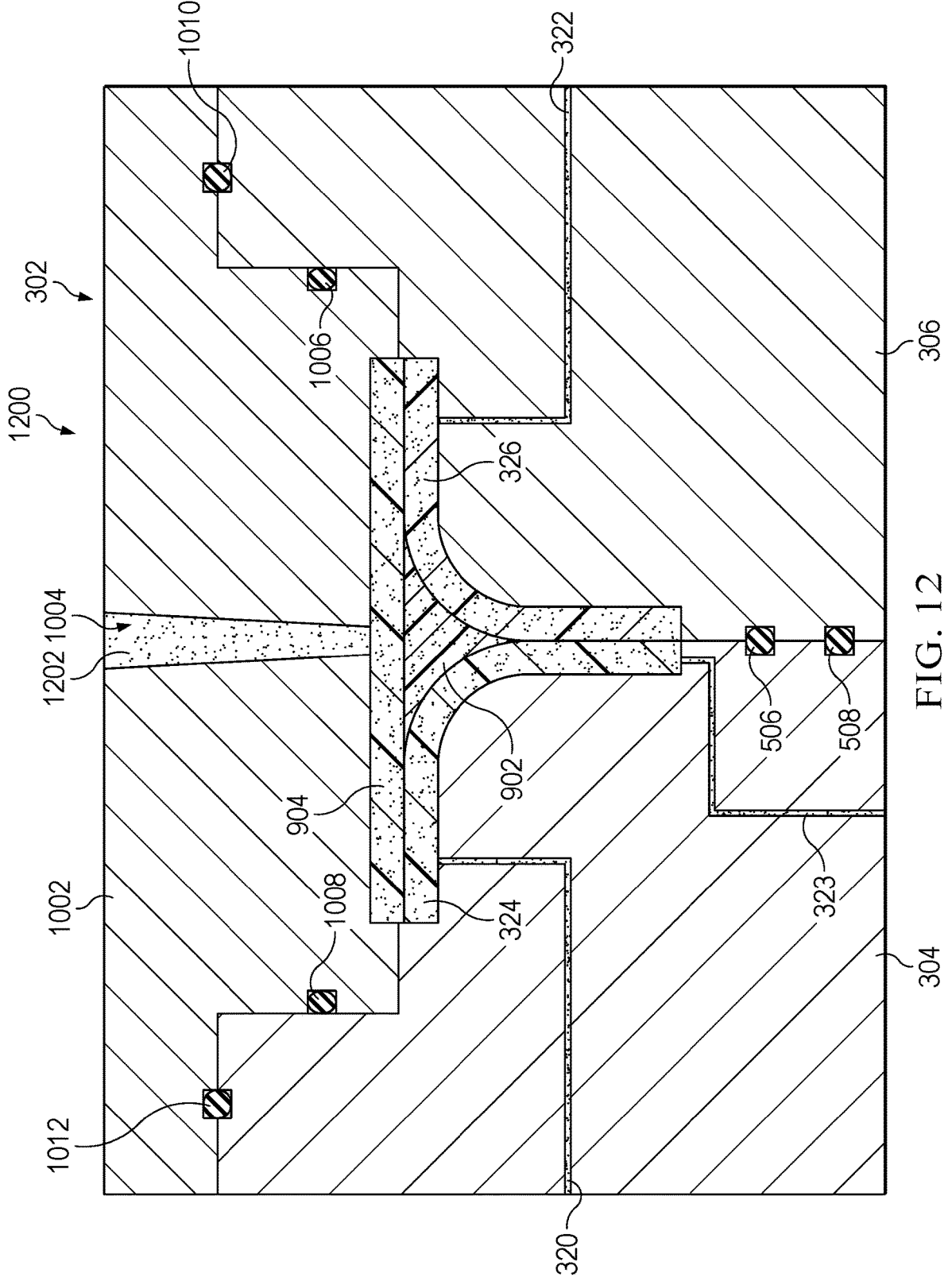
FIG. 12 is an illustration of a cross-sectional view of curing a stiffener preform in a curing chamber formed by a tool lid sealed against a first die and a second die in accordance with an illustrative embodiment.

Turning now to FIG. 12, an illustration of a cross-sectional view of curing a stiffener preform in a curing chamber formed by a tool lid sealed against a first die and a second die is depicted in accordance with an illustrative embodiment. In view 1200, resin 1202 is introduced to curing chamber 1104 via resin inlet 1004. Resin 1202 is infused into base material 904, noodle 902, first cut and kitted material 324, and second cut and kitted material 326 in curing chamber 1104.

During infusion of resin 1202, vacuum is drawn through number of vacuum paths 320, number of vacuum paths 322, and number of vacuum paths 323 to drive the resin into all of base material 904, noodle 902, first cut and kitted material 324, and second cut and kitted material 326. In some illustrative examples, heat is applied during infusion of resin 1202. In some illustrative examples, integral heating in first die 304 and second die 306 is used to heat base material 904, noodle 902, first cut and kitted material 324, and second cut and kitted material 326 during infusion of resin 1202.

Infusion of resin 1202 into base material 904, noodle 902, first cut and kitted material 324, and second cut and kitted material 326 forms composite stringer preform 1102. After infusion of resin 1202, composite stringer preform 1102 is cured. Heat and pressure are applied to cure composite stringer preform 1102 to create a blade stringer. In some illustrative examples, the heat is applied by integral heating of first die 304 and second die 306. The blade stringer formed by curing is the final cured part.

Composite stringer preform 1102 comprising the blade and the flange portions, flange portion 608 and flange portion 610, is cured while the blade and the flange portions are in contact with first die 304 and the second die 306. In FIGS. 3-12, a blade of the blade stringer is clamped between a first die and a second die; flange portions of the blade stringer are simultaneously formed onto the first die and the second die while the blade is clamped; and a composite stringer preform comprising the blade and the flange portions is cured while the blade and the flange portions are in contact with the first die and the second die.

Figure 13:
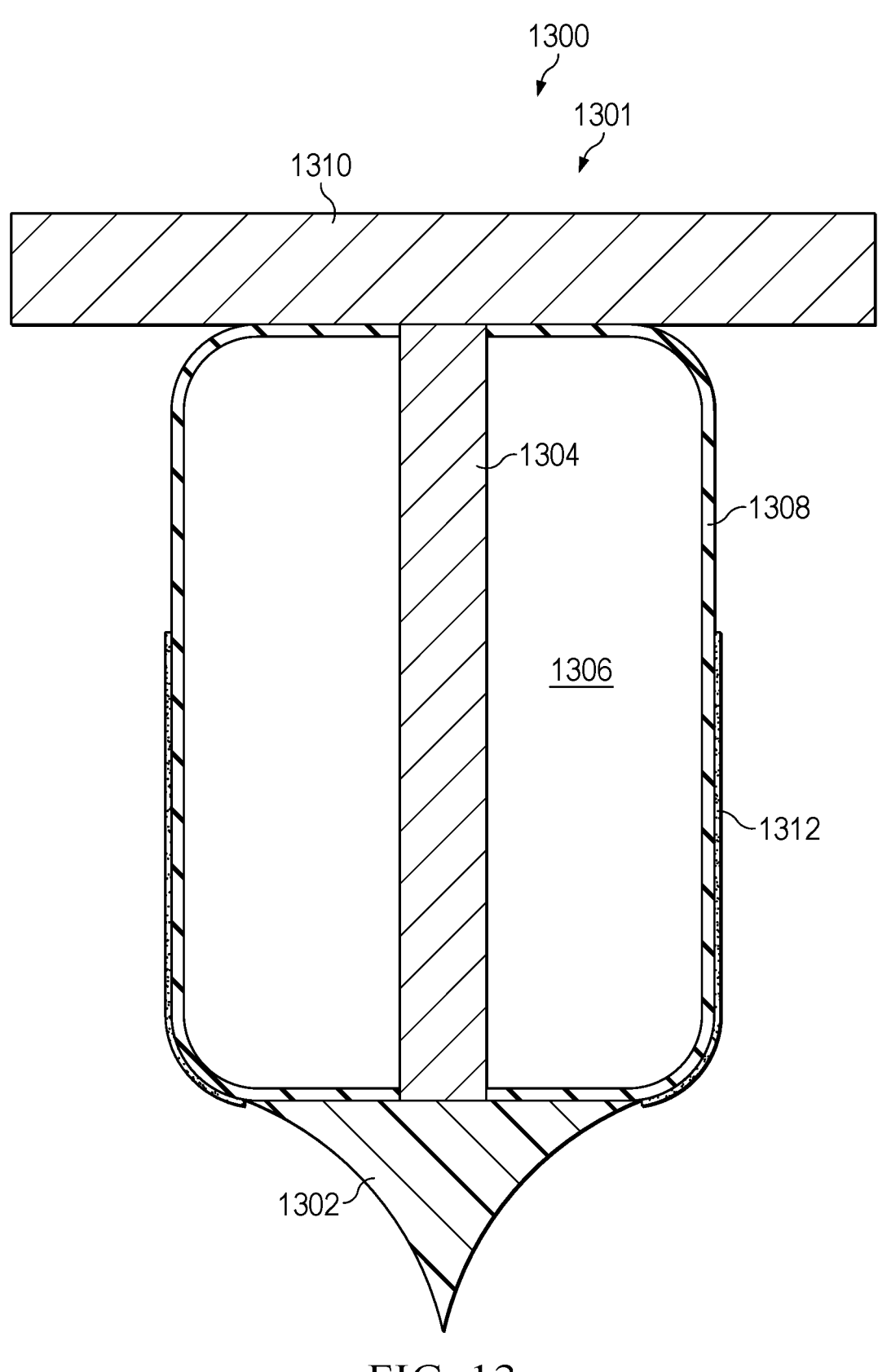
FIG. 13 is an illustration of a side view of a forming lid with stiffener and number of flexible bladders in accordance with an illustrative embodiment.

Turning now to FIG. 13, an illustration of a side view of a forming lid with stiffener and number of flexible bladders is depicted in accordance with an illustrative embodiment. In view 1300, forming device 1301 is shown with number of flexible bladders 1306 in inflated 1308 state. Forming device 1301 can be an example of forming device 239 of FIG. 2. Forming device can the be same as forming device 327 of FIGS. 3-8.

Forming device 1301 comprises wedge 1302 configured to initiate forming of cut and kitted materials, such as first cut and kitted material 228 and second cut and kitted material 230 of FIG. 2. Wedge 1302 is configured to form radiuses in the cut and kitted material to form a place for a noodle in a blade stringer. Wedge 1302 matches the outer mold line radiuses of the preform. In some illustrative examples, wedge 1302 can be formed of a solid material. In some illustrative examples, wedge 1302 can be inflatable.

Stiffener 1304 connects wedge 1302 to stiffener support 1310. Forming device 1301 can be moved by connection of a press or other system to stiffener support 1310. In some illustrative examples, stiffener support 1310 takes the form of a forming lid. Stiffener 1304 applies initial pressure to the cut and kitted materials. Stiffener 1304 provides stability to wedge 1302 and number of flexible bladders 1306. In some illustrative examples, stiffener 1304 is formed of a porous material. When stiffener 1304 is present within number of flexible bladders 1306, passthroughs in the porous material allow pressure to equalize. Although stiffener 1304 is depicted within a single flexible bladder, in some non-depicted illustrative examples, number of flexible bladders 1306 can include more than one flexible bladder.

In this illustrative example, number of films 1312 is present on the outside of number of flexible bladders 1306. Number of films 1312 is formed of a porous material to provide an air path for vacuum as part of forming.

Figure 14:
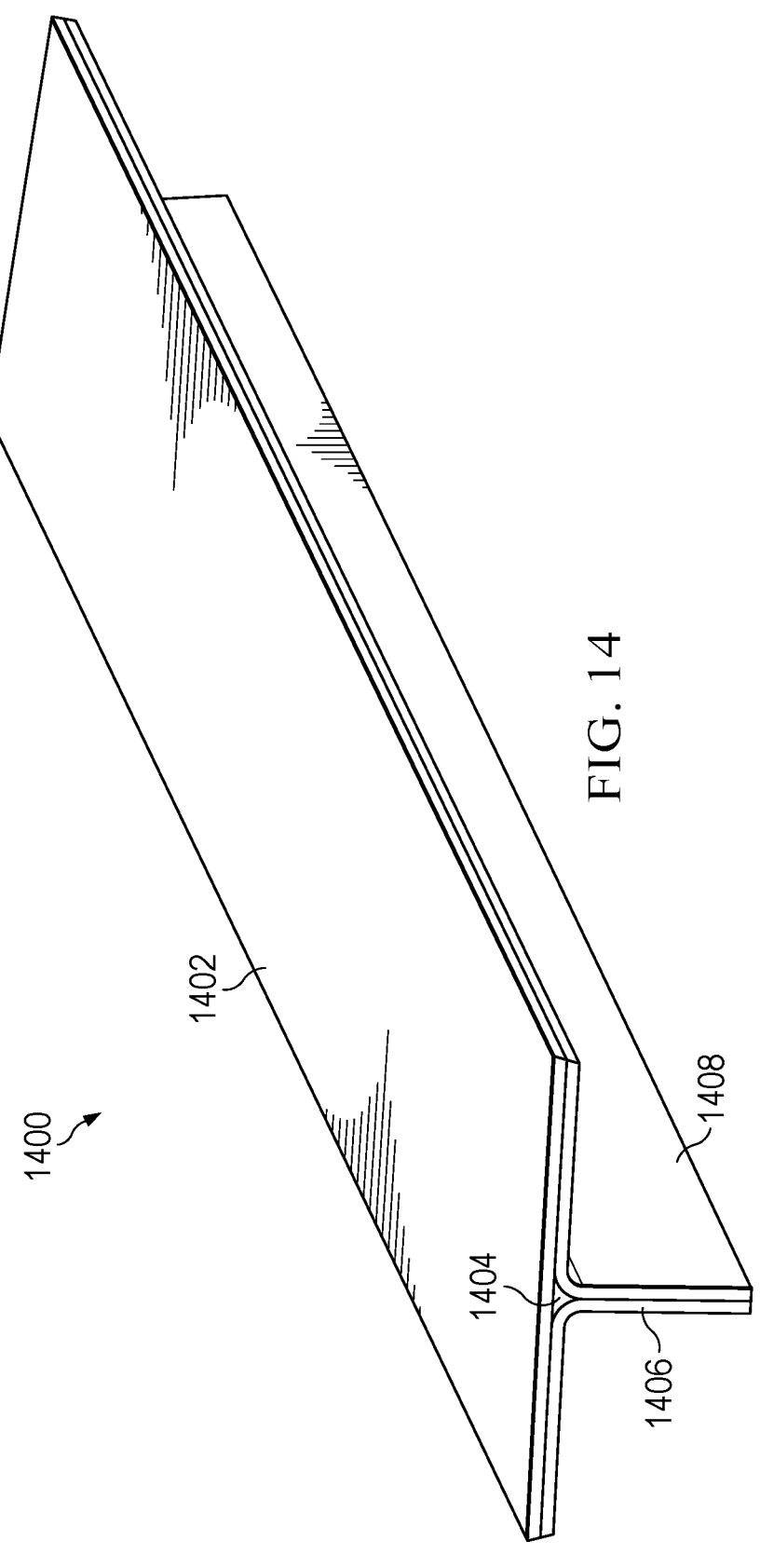
FIG. 14 is an illustration of a perspective view of a blade stringer in accordance with an illustrative embodiment.

Turning now to FIG. 14, an illustration of a perspective view of a blade stringer is depicted in accordance with an illustrative embodiment. Blade stringer 1400 can be a portion of aircraft 100 of FIG. 1. Blade stringer 1400 is a physical implementation of blade stringer 298 of FIG. 2. Blade stringer 1400 can be formed by forming and curing tool 202 of FIG. 2. Blade stringer 1400 can be formed and cured by forming and curing tool 302 of FIGS. 3-12. Blade stringer 1400 can be formed by forming device 1301 of FIG. 13.

Blade stringer 1400 is a cured composite component. Each of base 1402, noodle 1404, first L-shaped material 1406, and second L-shaped material 1408 are laid up, compacted, and cured together to form blade stringer 1400. Base 1402, first L-shaped material 1406, and second L-shaped material 1408 are formed of fiber sheets infused with resin.

Although blade stringer 1400 appears to be substantially straight, blade stringer 1400 can have a complex curvature. Surface of base 1402 has curvature perpendicular to length, and the length may pitch, roll, or yaw. The complex curvature for a specific blade stringer, such as blade stringer 1400, is based on a location within a platform, such as an aircraft. Different locations for blade stringers within a fuselage of an aircraft will have different complex curvatures.

In some illustrative examples, a cross-section of a blade stringer, such as blade stringer 1400, varies in gauge (thickness). To connect blade stringer 1400 to a skin, base 1402 will contact the skin. The skin may have ply drops to induce profile change.

The complex curvature, and possible non-symmetric flange/blade parts make conventional forming challenging and cure tooling complicated. The forming and curing tool of the illustrative examples make forming of blade stringer 1400 easier. The forming and curing tool of the illustrative examples make curing of blade stringer 1400 less complicated as the same tool is used for both forming and curing.

Figure 15:
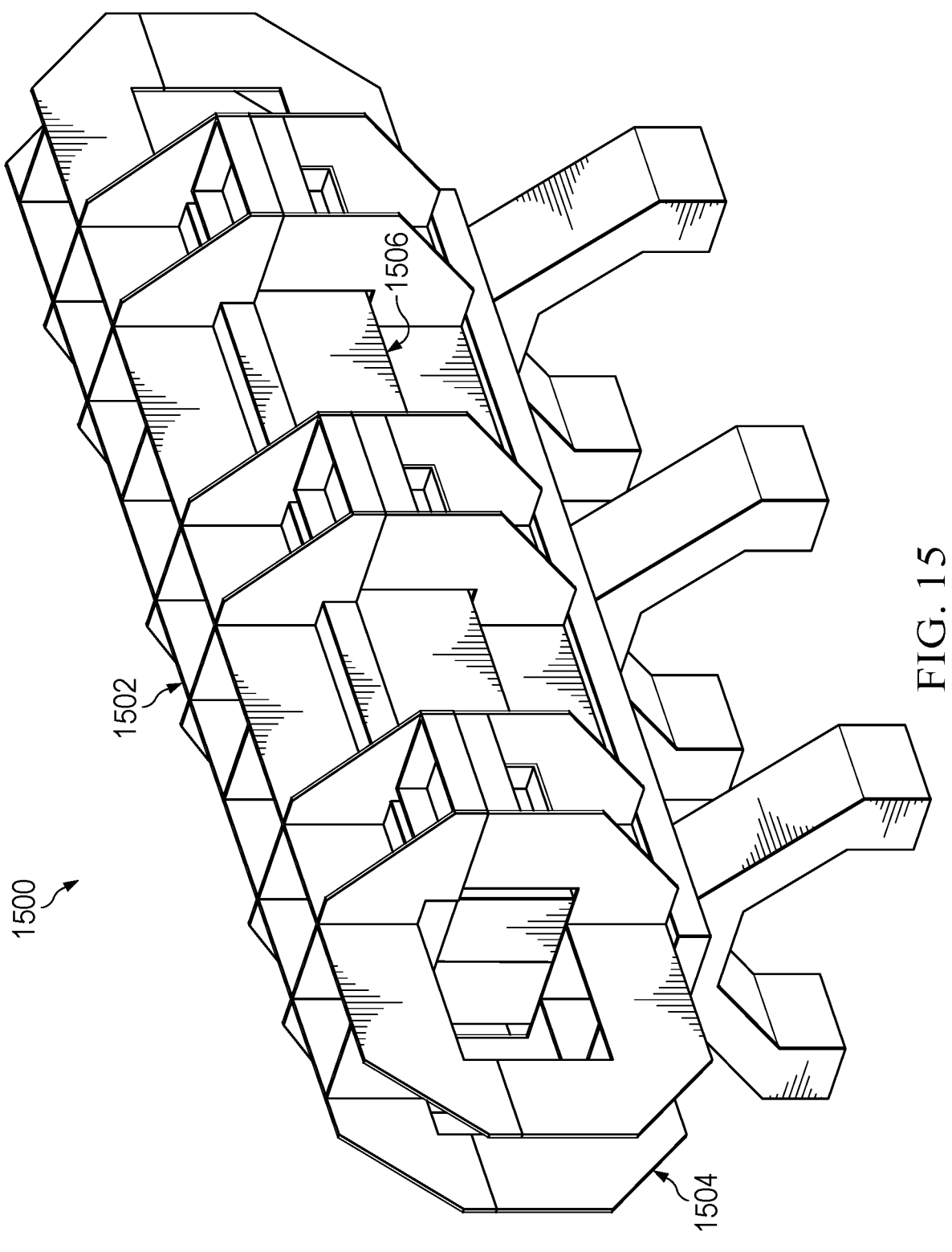
FIG. 15 is an illustration of a perspective view of a press with a number of dies and forming lid in accordance with an illustrative embodiment.

Turning now to FIG. 15, an illustration of a perspective view of a press with a number of dies and forming lid is depicted in accordance with an illustrative embodiment. Press 1500 is a physical implementation of press 294 of FIG. 2. Press 1500 can be used to move forming device 327, first die 304, and second die 306 of FIGS. 3-8. Press 1500 can be used to at least one of move or apply pressure to first die 304, second die 306, and tool lid 1002 of FIGS. 9-12. Press 1500 can be used to move forming device 1301 of FIG. 13. Press 1500 can be used to apply pressure and move tool components to manufacture blade stringer 1400 of FIG. 14.

Press 1500 comprises press top 1502 that provides vertical lifting of the forming lid and the tool lid. Press top 1502 also provides vertical pressing of the forming lid and the tool lid of the forming and curing tool 1506. Press top 1502 provides for forming of the material within cure and forming tool 1506. Press base 1504 holds a first die and a second die of forming and curing tool 1506.

Press base 1504 provides for horizontal press opening. Press base 1504 is configured to move a first die and a second die of forming and curing tool 1506. Press base 1504 applies pressure to a first die and a second die of forming and curing tool 1506 to compact the material between the first die and the second die.

Figure 16A:
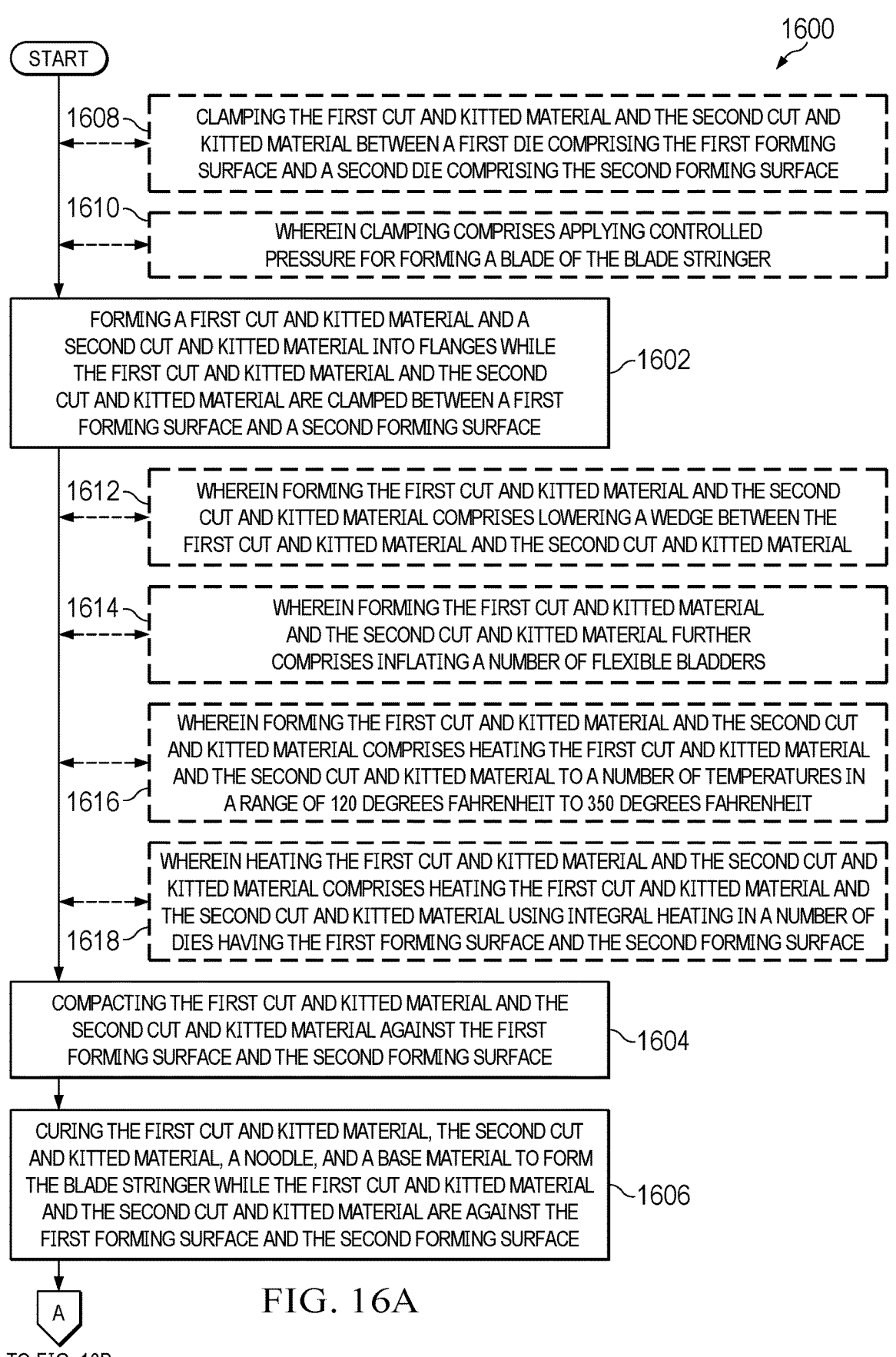

Turning now to FIGS. 16A and 16B, a flowchart of a method of forming a blade stringer is depicted in accordance with an illustrative embodiment. Method 1600 can be performed to form a component of aircraft 100 of FIG. 1. Method 1600 can be performed using forming and curing tool 202 of FIG. 2. Method 1600 can be performed using forming and curing tool 302 of FIGS. 3-12. Method 1600 can be performed using forming device 1301 of FIG. 13. Method 1600 can be performed to create blade stringer 1400 of FIG. 14. Method 1600 can be performed using press 1500 of FIG. 15.

Method 1600 forms a first cut and kitted material and a second cut and kitted material into flanges while the first cut and kitted material and the second cut and kitted material are clamped between a first forming surface and a second forming surface (operation 1602). Method 1600 compacts the first cut and kitted material and the second cut and kitted material against the first forming surface and the second forming surface (operation 1604). Method 1600 cures the first cut and kitted material, the second cut and kitted material, a noodle, and a base material to form the blade stringer while the first cut and kitted material and the second cut and kitted material are against the first forming surface and the second forming surface (operation 1606). Afterwards, method 1600 terminates.

In some illustrative examples, method 1600 clamps the first cut and kitted material and the second cut and kitted material between a first die comprising the first forming surface and a second die comprising the second forming surface (operation 1608). The portions of first cut and kitted material and the second cut and kitted material clamped between the first die and the second die form the blade of a resulting blade stringer. Clamping the first cut and kitted material and the second cut and kitted material holds the first cut and kitted material and the second cut and kitted material during forming. Further, clamping of the first cut and kitted material and the second cut and kitted material provides sufficient controlled pressure for forming. In some illustrative examples, clamping comprises applying controlled pressure for forming a blade of the blade stringer (operation 1610).

In some illustrative examples, forming the first cut and kitted material and the second cut and kitted material comprises lowering a wedge between the first cut and kitted material and the second cut and kitted material (operation 1612). By lowering the wedge between the first cut and kitted material and the second cut and kitted material, each cut and kitted material is bent away from the other cut and kitted material.

In some illustrative examples, forming the first cut and kitted material and the second cut and kitted material further comprises inflating a number of flexible bladders (operation 1614). Inflating the number of flexible bladders applies pressure to the first cut and kitted material and the second cut and kitted material. Inflating the number of flexible bladders applies pressure to bend the first cut and kitted material and the second cut and kitted material. Inflating the number of flexible bladders applies pressure to complete forming radiuses into the first cut and kitted material and the second cut and kitted material.

In some illustrative examples, forming the first cut and kitted material and the second cut and kitted material comprises heating the first cut and kitted material and the second cut and kitted material to a number of temperatures in a range of 120 degrees Fahrenheit to 350 degrees Fahrenheit (operation 1616). The number of temperatures are selected based on the type of material to be formed.

In some illustrative examples, heating the first cut and kitted material and the second cut and kitted material comprises heating the first cut and kitted material and the second cut and kitted material using integral heating in a number of dies having the first forming surface and the second forming surface (operation 1618). The integral heating can take any desirable form. In some illustrative examples, the integral heating can comprise at least one of liquid, electric, inductive, or steam heating.

In some illustrative examples, method 1600 applies a noodle and base material over the first cut and kitted material and second cut and kitted material after compacting the first cut and kitted material and the second cut and kitted material (operation 1620). The noodle is placed in the radius created by the wedge.

In some illustrative examples, method 1600 compacts the noodle and the base material while over the first cut and kitted material and the second cut and kitted material (operation 1622). In some illustrative examples, compacting the noodle and the base material comprises applying heat and controlled pressure (operation 1624).

In some illustrative examples, method 1600 infuses resin into the first cut and kitted material, the second cut and kitted material, the noodle, and the base material while the first cut and kitted material is in contact with the first forming surface and the second cut and kitted material is in contact with the second forming surface (operation 1626). In some illustrative examples, the resin is introduced into the curing chamber through a tool lid forming the curing chamber with the first die and the second die.

In some illustrative examples, curing comprises heating to a temperature in a range of 250 degrees Fahrenheit and 400 degrees Fahrenheit (operation 1628). The curing temperatures are selected based on the type of resin within the composite stringer preform.

Turning now to FIGS. 17A and 17B, a flowchart of a method of forming a blade stringer is depicted in accordance with an illustrative embodiment. Method 1700 can be performed to form a component of aircraft 100 of FIG. 1. Method 1700 can be performed using forming and curing tool 202 of FIG. 2. Method 1700 can be performed using forming and curing tool 302 of FIGS. 3-12. Method 1700 can be performed using forming device 1301 of FIG. 13. Method 1700 can be performed to create blade stringer 1400 of FIG. 14. Method 1700 can be performed using press 1500 of FIG. 15.

Method 1700 clamps a first cut and kitted material and a second cut and kitted material between a first die and a second die (operation 1702). Method 1700 forms the first cut and kitted material and the second cut and kitted material against the first die and the second die while the first cut and kitted material and the second cut and kitted material are clamped (operation 1704). Method 1700 applies a noodle and base material over the first cut and kitted material and second cut and kitted material (operation 1706). Method 1700 cures a composite stringer preform comprising the first cut and kitted material, the second cut and kitted material, the noodle, and the base material while the composite stringer preform is against the first die and the second die (operation 1708). Afterwards, method 1700 terminates.

In some illustrative examples, forming the first cut and kitted material and the second cut and kitted material against the first die and the second die comprises lowering a wedge between the first cut and kitted material and the second cut and kitted material, wherein the wedge is removed prior to applying the noodle and the base material (operation 1710). In some illustrative examples, forming the first cut and kitted material and the second cut and kitted material against the first die and the second die further comprises inflating a number of flexible bladders (operation 1712). In some illustrative examples, forming the first cut and kitted material and the second cut and kitted material comprises heating the first cut and kitted material and the second cut and kitted material to a number of temperatures in a range of 120 degrees Fahrenheit to 350 degrees Fahrenheit (operation 1714).

In some illustrative examples, heating the first cut and kitted material and the second cut and kitted material comprises heating the first cut and kitted material and the second cut and kitted material using integral heating in the first die and the second die (operation 1716). The integral heating can take any desirable form.

In some illustrative examples, method 1700 compacts the first cut and kitted material and the second cut and kitted material simultaneously by heating and compressing the first cut and kitted material against the first die and heating and compressing the second cut and kitted material against the second die (operation 1718).

In some illustrative examples, method 1700 infuses resin into the first cut and kitted material, the second cut and kitted material, the noodle, and the base material to form the composite stringer preform while the first cut and kitted material is in contact with the first die and the second cut and kitted material is in contact with the second die (operation 1720). In some illustrative examples, the resin is introduced to the dry materials through a resin inlet in a tool lid of the forming and curing tool. In some illustrative examples, vacuum applied through the first die and the second die can aid in driving the resin infusion.

In some illustrative examples, the first cut and kitted material, the second cut and kitted material, the noodle, and the base material are formed of prepreg composite material (operation 1722). In these illustrative examples, resin infusion is not performed in the forming and curing tool. In some illustrative examples, in which a resin inlet is present in the tool lid and the materials are prepreg, a plug or other form of stopper can be placed into the resin inlet for curing.

In some illustrative examples, method 1700 seals a tool lid against the first die and the second die to create a curing chamber (operation 1724). The composite stringer preform is compacted, degassed, optionally resin infused, and then cured in the curing chamber. Pressure, temperature, and vacuum are applied to the composite stringer preform in the curing chamber.

In some illustrative examples, curing the composite stringer preform comprises curing the composite stringer preform within the curing chamber, and wherein the base material is in contact with the tool lid during the curing (operation 1726). In some illustrative examples, curing the composite stringer preform comprises heating the composite stringer preform to a temperature in a range of 250 degrees Fahrenheit and 400 degrees Fahrenheit (operation 1728).

Figure 18A:
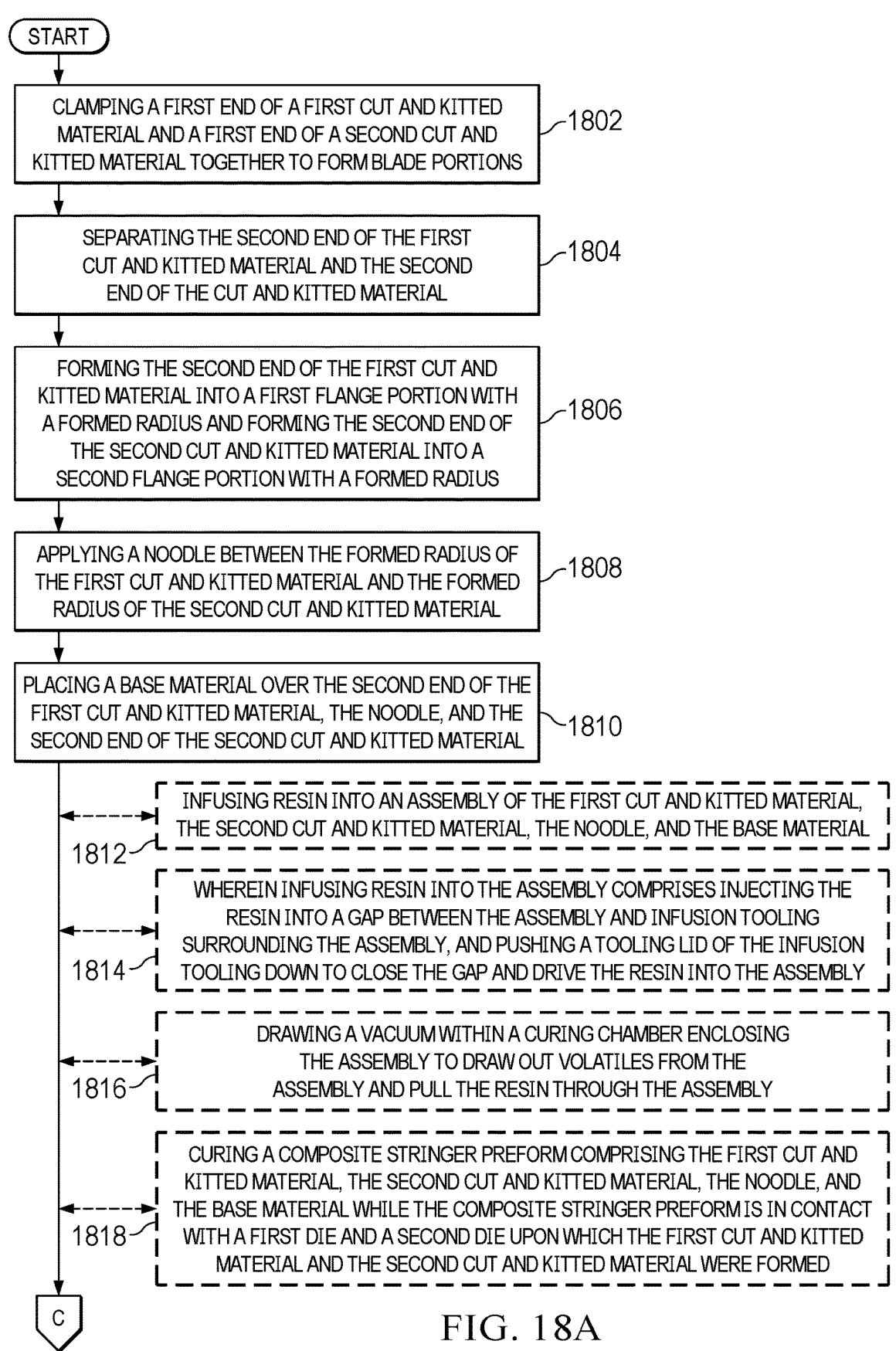

Turning now to FIGS. 18A and 18B, a flowchart of a method of forming a blade stringer is depicted in accordance with an illustrative embodiment. Method 1800 can be performed to form a component of aircraft 100 of FIG. 1. Method 1800 can be performed using forming and curing tool 202 of FIG. 2. Method 1800 can be performed using forming and curing tool 302 of FIGS. 3-12. Method 1800 can be performed using forming device 1301 of FIG. 13. Method 1800 can be performed to create blade stringer 1400 of FIG. 14. Method 1800 can be performed using press 1500 of FIG. 15.

Method 1800 clamps a first end of a first cut and kitted material and a first end of a second cut and kitted material together to form blade portions (operation 1802). Method 1800 separates the second end of the first cut and kitted material and the second end of the second cut and kitted material (operation 1804).

Method 1800 forms the second end of the first cut and kitted material into a first flange portion with a formed radius and forming the second end of the second cut and kitted material into a second flange portion with a formed radius (operation 1806). Method 1800 applies a noodle between the formed radius of the first cut and kitted material and the formed radius of the second cut and kitted material (operation 1808). Method 1800 places a base material over the second end of the first cut and kitted material, the noodle, and the second end of the second cut and kitted material (operation 1810). Afterwards, method 1800 terminates.

In some illustrative examples, method 1800 infuses resin into an assembly of the first cut and kitted material, the second cut and kitted material, the noodle, and the base material (operation 1812). In some illustrative examples, infusing resin into the assembly comprises injecting the resin into a gap between the assembly and infusion tooling surrounding the assembly, and pushing a tool lid of the infusion tooling down to close the gap and drive the resin into the assembly (operation 1814).

In some illustrative examples, method 1800 draws a vacuum within a curing chamber enclosing the assembly to draw out volatiles from the assembly and pull the resin through the assembly (operation 1816). In some illustrative examples, method 1800 cures a composite stringer preform comprising the first cut and kitted material, the second cut and kitted material, the noodle, and the base material while the composite stringer preform is in contact with a first die and a second die upon which the first cut and kitted material and the second cut and kitted material were formed (operation 1818).

In some illustrative examples, method 1800 heats a first die and a second die clamping the first cut and kitted material and the second cut and kitted material to a forming temperature during forming (operation 1820). In some illustrative examples, method 1800 heats the first die and the second die to a curing temperature during curing (operation 1822). In some illustrative examples, heating the first die and the second die comprises heating the first die and the second die using integral heating (operation 1824).

Figure 19:
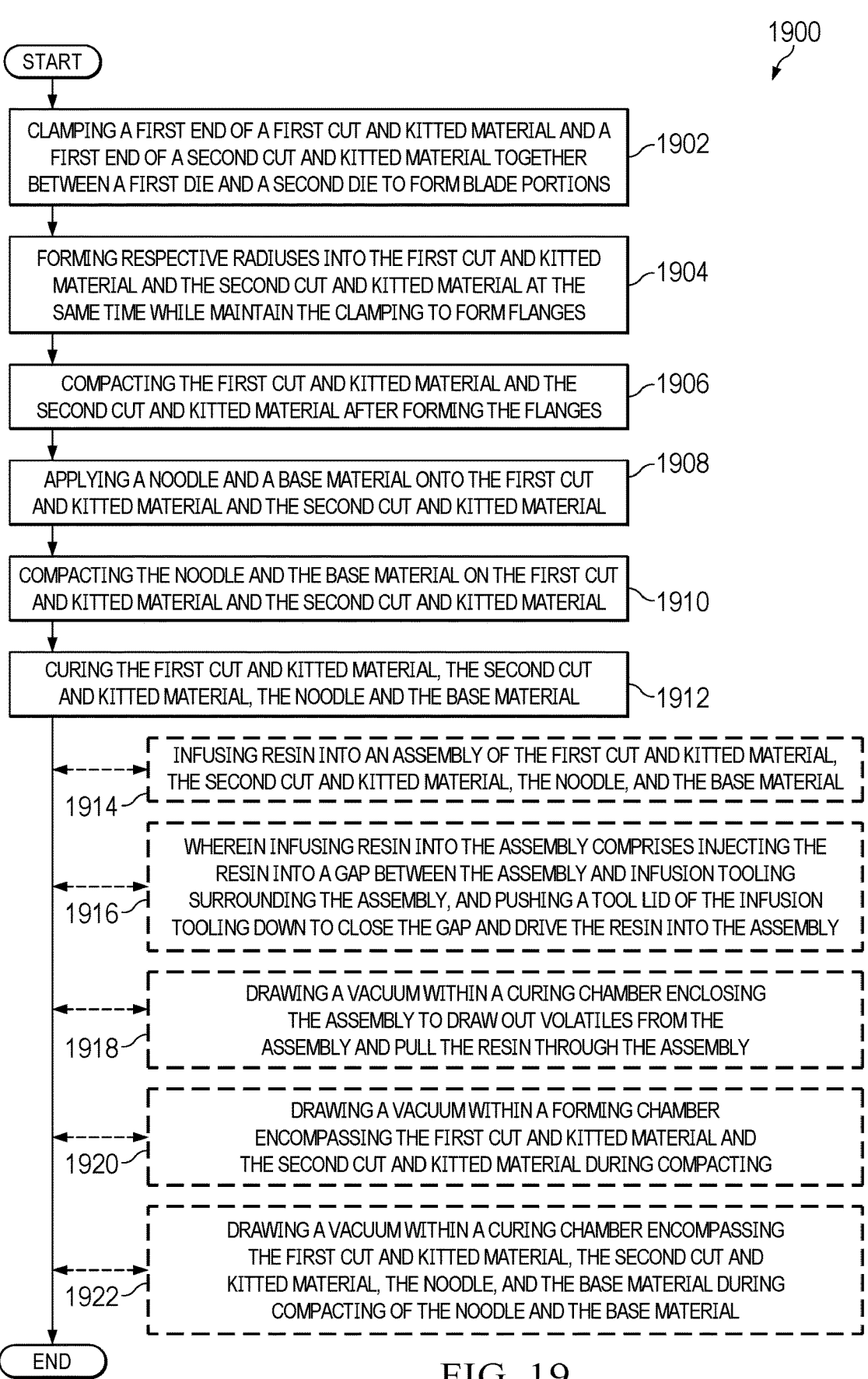
FIG. 19 are a flowchart of a method of forming a blade stringer in accordance with an illustrative embodiment.

Turning now to FIG. 19, a flowchart of a method of forming a blade stringer is depicted in accordance with an illustrative embodiment. Method 1900 can be performed to form a component of aircraft 100 of FIG. 1. Method 1900 can be performed using forming and curing tool 202 of FIG. 2. Method 1900 can be performed using forming and curing tool 302 of FIGS. 3-12. Method 1900 can be performed using forming device 1301 of FIG. 13. Method 1900 can be performed to create blade stringer 1400 of FIG. 14. Method 1900 can be performed using press 1500 of FIG. 15.

Method 1900 clamps a first end of a first cut and kitted material and a first end of a second cut and kitted material together between a first die and a second die to form blade portions (operation 1902). Method 1900 forms respective radiuses into the first cut and kitted material and the second cut and kitted material at the same time while maintaining the clamping to form flanges (operation 1904). Method 1900 compacts the first cut and kitted material and the second cut and kitted material after forming the flanges (operation 1906). Method 1900 applies a noodle and a base material onto the first cut and kitted material and the second cut and kitted material (operation 1908). Method 1900 compacts the noodle and the base material on the first cut and kitted material and the second cut and kitted material (operation 1910). Method 1900 cures the first cut and kitted material, the second cut and kitted material, the noodle, and the base material while the blade portions are clamped (operation 1912). Afterwards, method 1900 terminates.

In some illustrative examples, method 1900 infuses resin into an assembly of the first cut and kitted material, the second cut and kitted material, the noodle, and the base material (operation 1914). In some illustrative examples, infusing resin into the assembly comprises injecting the resin into a gap between the assembly and infusion tooling surrounding the assembly, and pushing a tool lid of the infusion tooling down to close the gap and drive the resin into the assembly (operation 1916).

In some illustrative examples, method 1900 draws a vacuum within a curing chamber enclosing the assembly to draw out volatiles from the assembly and pull the resin through the assembly (operation 1918). In some illustrative examples, method 1900 draws a vacuum within a forming chamber encompassing the first cut and kitted material and the second cut and kitted material during compacting (operation 1920). In some illustrative examples, method 1900 draws a vacuum within a curing chamber encompassing the first cut and kitted material, the second cut and kitted material, the noodle, and the base material during compacting of the noodle and the base material (operation 1922).

Turning now to FIG. 20, a flowchart of a method of forming a blade stringer is depicted in accordance with an illustrative embodiment. Method 2000 can be performed to form a component of aircraft 100 of FIG. 1. Method 2000 can be performed using forming and curing tool 202 of FIG. 2. Method 2000 can be performed using forming and curing tool 302 of FIGS. 3-12. Method 2000 can be performed using forming device 1301 of FIG. 13. Method 2000 can be performed to create blade stringer 1400 of FIG. 14. Method 2000 can be performed using press 1500 of FIG. 15.

Method 2000 clamps a blade of the blade stringer between a first die and a second die (operation 2002). Method 2000 simultaneously forming flange portions of the blade stringer onto the first die and the second die while the blade is clamped (operation 2004). Method 2000 cures a composite stringer preform comprising the blade and the flange portions while the blade and the flange portions are in contact with the first die and the second die (operation 2006).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1608 through operation 1628 may be optional. As another example, operation 1710 through operation 1728 may be optional. As another example, operation 1812 through operation 1824 may be optional. As yet another example, operation 1914 through operation 1922 may be optional.

Illustrative embodiments of the present disclosure may be described in the context of aircraft manufacturing and service method 2100 as shown in FIG. 21 and aircraft 2200 as shown in FIG. 22. Turning first to FIG. 21, an illustration of an aircraft manufacturing and service method in a form of a block diagram is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 takes place. Thereafter, aircraft 2200 may go through certification and delivery 2110 in order to be placed in service 2112. While in service 2112 by a customer, aircraft 2200 is scheduled for routine maintenance and service 2114, which may include modification, reconfiguration, refurbishment, or other maintenance and service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft in a form of a block diagram is depicted in which an illustrative embodiment may be implemented. In this example, aircraft 2200 is produced by aircraft manufacturing and service method 2100 of FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included.

Apparatuses and methods embodied herein may be employed during at least one of the stages of aircraft manufacturing and service method 2100. One or more illustrative embodiments may be manufactured or used during at least one of component and subassembly manufacturing 2106, system integration 2108, in service 2112, or maintenance and service 2114 of FIG. 21.

The illustrative examples combine forming and cure/infusion into a single cell with single tooling set to reduce capital costs. The illustrative examples utilize common tooling for forming and cure/infusion, in two configurations: a forming configuration and a cure/infusion configuration. The forming configuration includes a forming device comprising a forming lid with a stiffener, a wedge, and a number of flexible bladders.

The forming configuration includes two forming dies and a pressure application device. The pressure application device can take the form of the forming device with forming lid, stiffener, wedge, and number of flexible bladders. The cure/infusion configuration includes the two forming dies as cure mandrels and a cure/infusion lid.

Both the forming and the curing can be performed in a common press structure/equipment. The press structure/equipment can be used to apply pressure to the forming dies to clamp the number of cut and kitted materials. The press structure/equipment can be used to apply pressure to the forming lid to form the number of cut and kitted materials by lowering the wedge.

The press can open/close in vertical and horizontal axis. Horizontal movement can make space for forming, horizontal and vertical movements provide pressure during cure/infusion, vertical movement also is used to manipulate the forming device/method.

Between forming and curing, a tool swap is performed for the clamps/lids. In some illustrative examples, the other of the forming lid and the tool lid is kept close/on same equipment for flow. In some illustrative examples, the forming clamp and the cure lid could be same tool, with additional sealing.

Pick and Place (PnP) equipment can be used for loading preforms into forming/cure tools. In some illustrative examples, the common press design for similar stringers can control capital costs and provide commonality in production system. A common controller system can be used for out of autoclave cures.

In the illustrative examples, the first die and the second die are cleaned and loaded into a press. The unformed material is clamped into the first die and second die. The forming device is loaded into the press. The unformed material is brought to a forming temperature. The forming device is applied to form the unformed material. During forming, the number of flexible bladders are inflated, vacuum is drawn in the forming chamber, and the first die and second die are heated.

After forming, the forming device is retracted. The bladder is deflated, and the forming device is removed. After removing the forming device, a noodle is loaded. The base charge is then loaded. A tool lid is brought into place.

Pressure is applied to the tool lid to form the unformed material. The first die and second die are heated. A vacuum is applied to the forming chamber to degas the material. The first die and the second die are brought to infusion/cure temperature. In some illustrative examples, the material is infused with resin. The composite material is cured.

After curing, the tool lid is opened. The first die and the second die are opened. The cured part is removed.

The illustrative examples provide dry fabric stringer forming, infusion, and curing in one tool. The parting plane with pressure intensifier (wedge) of size and curvature complementary to the outer mold line (OML) of the radius (noodle) divides, separates the two dry preforms to begin the forming process. The bladder is then expanded to form each radius of the perform with flange of uniform thickness against respective first die or second die. The inflation of the bladder creates a tension during radius forming. In some illustrative examples, heat can be added to melt binder without adding residual stress. After forming, heat and pressure can be applied to compact the number of cut and kitted materials. Afterwards, a parting plane can be removed. After compaction, the bladders and the forming lid can be removed.

After removing the forming lid, a noodle and a base ply charge are placed onto the formed cut and kitted materials. A tool lid is placed over base ply charge. In some illustrative examples, the tool lid is an infusion lid. The tool lid can be used to perform a degas and compaction followed by a gapped infusion. In a gapped resin infusion, the tool lid pushes the resin down through the preform and additional vacuum helps pull the resin. Vacuum applied during resin infusion also removes volatiles. After resin infusion, the tool lid remains in place during cure. Tools heat to infusion and cure temperature to produce the final cured part.

The manufacturing can be a highly automated and high rate. The layup of material can be ply-by-ply or full stack of +−45, 0, 90. In some illustrative examples, thermoplastic (TP) veil or powder binder can be used to help maintain debulk thickness during infusion.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A forming and curing tool for a blade stringer, wherein the forming and curing tool comprises:
   a forming lid;
   a stiffener connected to and perpendicular to the forming lid;
   a number of flexible bladders surrounding the stiffener;
   a first die and a second die configured to:
      clamp cut and kitted materials; and
      engage with the forming lid; and
   a wedge connected to the stiffener and configured to spread the cut and kitted materials.

2. The forming and curing tool of claim 1, wherein the wedge has a geometry of a noodle to be placed in the blade stringer.

3. The forming and curing tool of claim 1, wherein the wedge is inflatable.

4. The forming and curing tool of claim 1, wherein the stiffener is porous.

5. The forming and curing tool of claim 1, wherein the number of flexible bladders comprises a number of air paths for compacting components of a blade stringer.

6. The forming and curing tool of claim 1, further comprising a number of seals on the forming lid configured to seal the forming lid to the first die and the second die.

7. The forming and curing tool of claim 6, further comprising a forming chamber formed between the forming lid and the first die and the second die.

8. The forming and curing tool of claim 7, further comprising:
   a press configured to hold and move the first die and the second die, and the forming lid relative to each other.

9. A forming and curing tool for a blade stringer, wherein the forming and curing tool comprises:
   a first die with a number of vacuum paths through the first die and a first forming surface, wherein the first forming surface comprises:
      a first blade face; and
      a first flange face;
   a second die with a number of vacuum paths and a second forming surface, wherein the second forming surface comprises:
      a second blade face; and
      a second flange face;
   the second die and the first die configured to clamp cut and kitted materials between the first forming surface and the second forming surface; and

25 a number of flexible bladders positioned above the first die and the second die, connected to a stiffener connected to and perpendicular to a forming lid;

a wedge connected to the stiffener and configured to spread the cut and kitted materials, wherein the number of flexible bladders are configured to simultaneously form the number of cut and kitted materials and then simultaneously compress a first cut and kitted material of the number of cut and kitted materials against the first flange face and a second cut and kitted material of the number of cut and kitted materials against the second flange face.

10. The forming and curing tool of claim 9, wherein the stiffener connects the forming lid and the number of flexible bladders.

11. The forming and curing tool of claim 10, wherein the wedge having a geometry of a noodle is joined into the blade stringer.

12. The forming and curing tool of claim 9, further comprising a tool lid configured to seal against the first die and the second die to create a curing chamber.

13. The forming and curing tool of claim 12, wherein the tool lid comprises a number of resin inlets.

14. The forming and curing tool of claim 9, wherein the first die and the second die are integrally heated.

15. The forming and curing tool of claim 9, further comprising:

a press configured to hold and move: the first die, the second die, and the number of flexible bladders relative to each other.

16. A forming and curing tool for a blade stringer, wherein the forming and curing tool comprises:

a first die with a first forming surface comprising a first blade face and a first flange face and a number of vacuum paths through the first die;

a second die with a number of vacuum paths and a second forming surface comprising a second blade face and a second flange face, the second die configured to clamp a number of cut and kitted materials between the first blade face and the second blade face for forming a number of cut and kitted materials against the first flange face and the second flange face;

a forming lid configured to seal against the first die and the second die to create a curing chamber;

a stiffener connected to and perpendicular to the forming lid;

a number of flexible bladders surrounding the stiffener; and a wedge connected to the stiffener and configured to spread the cut and kitted materials.

17. The forming and curing tool of claim 16, wherein the forming lid comprises a number of resin inlets.

18. The forming and curing tool of claim 16, wherein the forming lid is configured to seal against the first die and the second die to create a forming chamber.

19. The forming and curing tool of claim 16, further comprising:

a press configured to hold and move the first die, the second die, and the forming lid relative to each other.

20. A method of forming a blade stringer, the method comprising:

placing a first cut and kitted material against a second cut and kitted material and clamping them together between a first die and a second die;

driving, with a forming lid connected to a stiffener between flexible bladders, a wedge connected to the stiffener between the first cut and kitted material against the second cut and kitted material;

forming the first cut and kitted material onto a first flange face of a first forming surface on the first die and forming the second cut and kitted material onto a second flange face of a second forming surface on the second die while the first cut and kitted material and the second cut and kitted material are clamped between the first forming surface and the second forming surface;

inflating the flexible bladders and compacting the first cut and kitted material against the first forming surface and the second cut and kitted material against the second forming surface; and curing, while the composite stringer preform is against the first forming surface and the second forming surface, a composite stringer preform and forming the blade stringer, the composite stringer preform comprising the first cut and kitted material, the second cut and kitted material, a noodle, and a base material.

21. A method of forming a blade stringer, the method comprising:

clamping a first cut and kitted material and a second cut and kitted material between a first die and a second die;

driving, with a forming lid connected to a stiffener between flexible bladders, a wedge connected to the stiffener between the first cut and kitted material against the second cut and kitted material;

forming, while the first cut and kitted material and the second cut and kitted material are clamped, by inflating one of the flexible bladders and pressing the first cut and kitted material and the second cut and kitted material against the first die and simultaneously inflating a second of the flexible bladders and pressing the second cut and kitted material against the second die;

applying a noodle and base material over the first cut and kitted material and second cut and kitted material; and curing a composite stringer preform comprising the first cut and kitted material, the second cut and kitted material, the noodle, and the base material while the composite stringer preform is against the first die and the second die.

22. A method of forming a blade stringer comprising:

clamping a first end of a first cut and kitted material and a first end of a second cut and kitted material together to form blade portions;

separating, using a wedge connected to a stiffener between flexible bladders and connected to a forming lid, a second end of the first cut and kitted material and a second end of the second cut and kitted material;

forming, by inflating one of the flexible bladders, the second end of the first cut and kitted material into a first flange portion with a formed radius and forming, by simultaneously inflating a second of the flexible bladders, the second end of the second cut and kitted material into a second flange portion with a formed radius;

applying a noodle between the formed radius of the first cut and kitted material and the formed radius of the second cut and kitted material; and placing a base material over the second end of the first cut and kitted material, the noodle, and the second end of the second cut and kitted material.

23. A forming and curing tool for a blade stringer, wherein the forming and curing tool comprises:

a first die with a first forming surface that comprises a first blade face and a first flange face;

a second die with a second forming surface that comprises a second blade face and a second flange face, the second die and the first die configured to clamp a number of cut and kitted materials between the first forming surface and the second forming surface;

a stiffener connected to and perpendicular to a forming lid;

a number of flexible bladders surrounding the stiffener;

a wedge connected to the stiffener and configured to spread the cut and kitted materials, wherein the stiffener, the flexible bladders, and the wedge, are positioned above the first die and the second die and configured to simultaneously form the number of cut and kitted materials and then simultaneously compress a first cut and kitted material of the number of cut and kitted materials against the first flange face and a second cut and kitted material of the number of cut and kitted materials against the second flange face;

a tool lid configured to seal against the first die and the second die to create a curing chamber; and a press configured to hold and move the first die, the second die, the forming device, and the tool lid relative to each other.

24. A method of forming a blade stringer, the method comprising:

clamping a first end of a first cut and kitted material and a first end of a second cut and kitted material together between a first die and a second die to form blade portions;

forming flanges, by driving, with a forming lid connected to a stiffener between flexible bladders, a wedge connected to the stiffener between the first cut and kitted material against the second cut and kitted material, respective radiuses into the first cut and kitted material and the second cut and kitted material at the same time while maintaining the clamping;

compacting the first cut and kitted material and the second cut and kitted material after forming the flanges;

applying a noodle and a base material onto the first cut and kitted material and the second cut and kitted material;

compacting the noodle and the base material on the first cut and kitted material and the second cut and kitted material; and curing first cut and kitted material, the second cut and kitted material, the noodle, and the base material while the blade portions are clamped.

25. A method of forming a blade stringer, the method comprising:

clamping a blade of the blade stringer between a first die and a second die;

driving, with a forming lid connected to a stiffener between flexible bladders, a wedge connected to the stiffener between the first cut and kitted material against the second cut and kitted material and simultaneously forming flange portions of the blade stringer onto the first die and the second die while the blade is clamped; and curing a composite stringer preform comprising the blade and the flange portions while the blade and the flange portions are in contact with the first die and the second die.

* * * * *